United States Patent
Li et al.

(10) Patent No.: US 12,041,474 B2
(45) Date of Patent: Jul. 16, 2024

(54) LAYER-SPECIFIC COEFFICIENT QUANTITY AND/OR QUANTIZATION SCHEME REPORTING FOR TYPE II CHANNEL STATE INFORMATION COMPRESSION

(71) Applicant: QUALCOMM Incorporated, San Diego, CA (US)

(72) Inventors: Qiaoyu Li, Beijing (CN); Liangming Wu, Beijing (CN); Chenxi Hao, Beijing (CN); Yu Zhang, Beijing (CN); Chao Wei, Beijing (CN); Min Huang, Beijing (CN); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 17/309,757

(22) PCT Filed: Jan. 15, 2020

(86) PCT No.: PCT/CN2020/072193
§ 371 (c)(1),
(2) Date: Jun. 17, 2021

(87) PCT Pub. No.: WO2020/147741
PCT Pub. Date: Jul. 23, 2020

(65) Prior Publication Data
US 2022/0060919 A1 Feb. 24, 2022

(51) Int. Cl.
*H04W 24/10* (2009.01)
*H04L 5/00* (2006.01)

(52) U.S. Cl.
CPC .......... *H04W 24/10* (2013.01); *H04L 5/0057* (2013.01)

(58) Field of Classification Search
CPC .............................. H04W 24/10; H04L 5/0057
(Continued)

(56) References Cited

U.S. PATENT DOCUMENTS

2018/0076871 A1 3/2018 Rahman et al.
2018/0175993 A1* 6/2018 Onggosanusi ........ H04L 5/0057
(Continued)

FOREIGN PATENT DOCUMENTS

CN 102104452 A 6/2011
CN 108353272 A 7/2018
(Continued)

OTHER PUBLICATIONS

Huawei et al., "Discussion on CSI Enhancement for MU-MIMO", 3GPP TSG RAN WG1 Meeting #94bis, R1-1810103, 3rd Generation Partnership Project, Mobile Competence Centre, 650, Route Des Lucioles, F-06921 Sophia-Antipolis Cedex France, vol. RAN WG1, No. Chengdu, China, Oct. 8-Oct. 12, 2018 Sep. 29, 2018, XP051517518, 10 Pages, pp. 2,4,5,7-p. 8, figure 3.
(Continued)

*Primary Examiner* — Christopher R Crompton
(74) *Attorney, Agent, or Firm* — Harrity & Harrity, LLP

(57) ABSTRACT

Aspects of the present disclosure relate to wireless communication. In some aspects, a user equipment may determine at least one of: a first number of coefficients to be included in a first set of coefficients in a transfer domain that characterize compressed channel state information (CSI) for a first layer, or a first quantization scheme to be used to interpret the first set of coefficients. The UE may determine at least one of: a second number of coefficients to be included in a second set of coefficients in the transfer domain that characterize the compressed CSI for a second layer, or a second quantization scheme to be used to interpret the second set of coefficients. The UE may transmit a report that (Continued)

identifies the first set of coefficients and the second set of coefficients based at least in part on the determination(s). Other aspects are provided.

30 Claims, 12 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2018/0198561 A1* | 7/2018 | Tsai ....................... | H03M 13/13 |
| 2020/0220598 A1 | 7/2020 | Zhang et al. | |
| 2020/0228178 A1* | 7/2020 | Mittal ................. | H04L 27/2613 |
| 2022/0131589 A1 | 4/2022 | Li et al. | |

FOREIGN PATENT DOCUMENTS

| | | |
|---|---|---|
| CN | 108432276 A | 8/2018 |
| EP | 3905565 A1 | 11/2021 |
| WO | 2017034270 A1 | 3/2017 |
| WO | 2018097600 A1 | 5/2018 |
| WO | 2020147104 A1 | 7/2020 |
| WO | 2020147741 A1 | 7/2020 |

OTHER PUBLICATIONS

Samsung: "CSI Enhancement for MU-MIMO", 3GPP TSG RAN WG1 AH-1901, R1-1901276 CSI Enhancement for MU-MIMO R3, 3rd Generation Partnership Project, Mobile Competence Centre, 650, Route Des Lucioles, F-06921 Sophia-Antipolis Cedex France, vol. RAN WG1, No. Taipei, Taiwan, Jan. 21-Jan. 25, 2019 Jan. 17, 2019, XP051601222, 10 Pages, p. 7.
Supplementary European Search Report—EP20741243—Search Authority—Munich—dated Sep. 14, 2022.
CATT: "Considerations on Type II CSI Enhancement", 3GPP TSG RAN WG1 Meeting #95, R1-1812634, Nov. 16, 2018 (Nov. 16, 2018), 7 Pages, section 2.
International Search Report and Written Opinion—PCT/CN2019/072305—ISA/EPO—dated May 29, 2019.
International Search Report and Written Opinion—PCT/CN2020/072193—ISA/EPO—dated Apr. 15, 2020.
Qualcomm Incorporated: "CSI Enhancement for MU-MIMO Support", 3GPP TSG RAN WG1 Meeting #94bis, R1-1811276, Oct. 12, 2018 (Oct. 12, 2018), 6 Pages.
Nokia et al., "Remaining Details on CSI Reporting for Type II and Type I Codebook", 3GPP TSG RAN WG1 Meeting 90bis, R1-1718510, No. Prague, CZ, Oct. 9-Oct. 13, 2017, 10 Pages, Oct. 13, 2017.
CATT: "Discussions on Type II CSI Enhancement", 3GPP Draft, 3GPP TSG RAN WG1 Ad-Hoc Meeting 1901, R1-1900338, 3rd Generation Partnership Project (3GPP), Mobile Competence Centre, 650, Route Des Lucioles, F-06921 Sophia-Antipolis Cedex, France, vol. Ran WG1, No. Taipei, Jan. 21, 2019-Jan. 25, 2019, Jan. 20, 2019 (Jan. 20, 2019), XP051593252, 16 Pages, Section 1, p. 1 Section 2.4.2, p. 13-p. 15, figure 6.

* cited by examiner

LAYER-SPECIFIC COEFFICIENT QUANTITY AND/OR QUANTIZATION SCHEME REPORTING FOR TYPE II CHANNEL STATE INFORMATION COMPRESSION

CROSS-REFERENCE TO RELATED APPLICATIONS

This application is a 371 national stage of International Patent Application No. PCT/CN2020/072193, filed on Jan. 15, 2020, entitled "LAYER-SPECIFIC COEFFICIENT QUANTITY AND/OR QUANTIZATION SCHEME REPORTING FOR TYPE II CHANNEL STATE INFORMATION COMPRESSION," which claims priority to Patent Cooperation Treaty (PCT) Application No. PCT/CN2019/072305, filed on Jan. 18, 2019, entitled "LAYER-SPECIFIC COEFFICIENT QUANTITY AND/OR QUANTIZATION SCHEME REPORTING FOR TYPE II CHANNEL STATE INFORMATION COMPRESSION," which are hereby expressly incorporated by reference herein.

FIELD OF THE DISCLOSURE

Aspects of the present disclosure generally relate to wireless communication and to techniques and apparatuses for layer-specific coefficient quantity and/or quantization scheme reporting for Type II channel state information compression.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a UE, may include transmitting, to a base station, a report that indicates a first number of coefficients in a transfer domain to be used to characterize compressed channel state information (CSI) for a first layer and a second number of coefficients in the transfer domain to be used to characterize the compressed CSI for a second layer; and transmitting information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients In some aspects, a UE for wireless communication may include memory and one or more processors operatively coupled to the memory. The memory and the one or more processors may be configured to transmit, to a base station, a report that indicates a first number of coefficients in a transfer domain to be used to characterize compressed channel state information (CSI) for a first layer and a second number of coefficients in the transfer domain to be used to characterize the compressed CSI for a second layer; and transmit information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients.

In some aspects, a non-transitory computer-readable medium may store one or more instructions for wireless communication. The one or more instructions, when executed by one or more processors of a UE, may cause the one or more processors to transmit, to a base station, a report that indicates a first number of coefficients in a transfer domain to be used to characterize compressed channel state information (CSI) for a first layer and a second number of coefficients in the transfer domain to be used to characterize the compressed CSI for a second layer; and transmit information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients.

In some aspects, an apparatus for wireless communication may include means for transmitting, to a base station, a report that indicates a first number of coefficients in a transfer domain to be used to characterize compressed channel state information (CSI) for a first layer and a second number of coefficients in the transfer domain to be used to characterize the compressed CSI for a second layer; and means for transmitting information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients.

In some aspects, a method of wireless communication, performed by a UE, may include transmitting, to a base station, a report that indicates: a first quantization scheme to be used to interpret a first set of coefficients that characterize compressed channel state information (CSI) for a first layer, and a second quantization scheme to be used to interpret a second set of coefficients that characterize the compressed CSI for the second layer; and transmitting information that identifies the first set of coefficients and the second set of coefficients.

In some aspects, a UE for wireless communication may include memory and one or more processors operatively coupled to the memory. The memory and the one or more processors may be configured to transmit, to a base station, a report that indicates: a first quantization scheme to be used to interpret a first set of coefficients that characterize compressed channel state information (CSI) for a first layer, and a second quantization scheme to be used to interpret a second set of coefficients that characterize the compressed CSI for the second layer; and transmit information that identifies the first set of coefficients and the second set of coefficients.

In some aspects, a non-transitory computer-readable medium may store one or more instructions for wireless communication. The one or more instructions, when executed by one or more processors of a UE, may cause the one or more processors to transmit, to a base station, a report that indicates: a first quantization scheme to be used to interpret a first set of coefficients that characterize compressed channel state information (CSI) for a first layer, and a second quantization scheme to be used to interpret a second set of coefficients that characterize the compressed CSI for the second layer; and transmit information that identifies the first set of coefficients and the second set of coefficients.

In some aspects, an apparatus for wireless communication may include means for transmitting, to a base station, a report that indicates: a first quantization scheme to be used to interpret a first set of coefficients that characterize compressed channel state information (CSI) for a first layer, and a second quantization scheme to be used to interpret a second set of coefficients that characterize the compressed CSI for the second layer; and means for transmitting information that identifies the first set of coefficients and the second set of coefficients.

In some aspects, a method of wireless communication, performed by a UE, may include determining at least one of: a first number of coefficients to be included in a first set of coefficients in a transfer domain that characterize compressed channel state information (CSI) for a first layer, or a first quantization scheme to be used to interpret the first set of coefficients in the transfer domain; determining at least one of: a second number of coefficients to be included in a second set of coefficients in the transfer domain that characterize the compressed CSI for a second layer, or a second quantization scheme to be used to interpret the second set of coefficients in the transfer domain; and transmitting a report that identifies the first set of coefficients and the second set of coefficients based at least in part on determining at least one of the first number of coefficients or the first quantization scheme, and based at least in part on determining at least one of the second number of coefficients or the second quantization scheme.

In some aspects, a UE for wireless communication may include memory and one or more processors operatively coupled to the memory. The memory and the one or more processors may be configured to determine at least one of: a first number of coefficients to be included in a first set of coefficients in a transfer domain that characterize compressed channel state information (CSI) for a first layer, or a first quantization scheme to be used to interpret the first set of coefficients in the transfer domain; determine at least one of: a second number of coefficients to be included in a second set of coefficients in the transfer domain that characterize the compressed CSI for a second layer, or a second quantization scheme to be used to interpret the second set of coefficients in the transfer domain; and transmit a report that identifies the first set of coefficients and the second set of coefficients based at least in part on determining at least one of the first number of coefficients or the first quantization scheme, and based at least in part on determining at least one of the second number of coefficients or the second quantization scheme.

In some aspects, a non-transitory computer-readable medium may store one or more instructions for wireless communication. The one or more instructions, when executed by one or more processors of a UE, may cause the one or more processors to determine at least one of: a first number of coefficients to be included in a first set of coefficients in a transfer domain that characterize compressed channel state information (CSI) for a first layer, or a first quantization scheme to be used to interpret the first set of coefficients in the transfer domain; determine at least one of: a second number of coefficients to be included in a second set of coefficients in the transfer domain that characterize the compressed CSI for a second layer, or a second quantization scheme to be used to interpret the second set of coefficients in the transfer domain; and transmit a report that identifies the first set of coefficients and the second set of coefficients based at least in part on determining at least one of the first number of coefficients or the first quantization scheme, and based at least in part on determining at least one of the second number of coefficients or the second quantization scheme.

In some aspects, an apparatus for wireless communication may include means for determining at least one of: a first number of coefficients to be included in a first set of coefficients in a transfer domain that characterize compressed channel state information (CSI) for a first layer, or a first quantization scheme to be used to interpret the first set of coefficients in the transfer domain; means for determining at least one of: a second number of coefficients to be included in a second set of coefficients in the transfer domain that characterize the compressed CSI for a second layer, or a second quantization scheme to be used to interpret the second set of coefficients in the transfer domain; and means for transmitting a report that identifies the first set of coefficients and the second set of coefficients based at least in part on determining at least one of the first number of coefficients or the first quantization scheme, and based at least in part on determining at least one of the second number of coefficients or the second quantization scheme.

In some aspects, a method of wireless communication, performed by a base station, may include receiving, from a user equipment (UE), a report that indicates a first number of coefficients in a transfer domain to be used to characterize compressed channel state information (CSI) for a first layer and a second number of coefficients in the transfer domain to be used to characterize the compressed CSI for a second layer; and receiving information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients.

In some aspects, a base station for wireless communication may include memory and one or more processors operatively coupled to the memory. The memory and the one or more processors may be configured to receive, from a user equipment (UE), a report that indicates a first number of coefficients in a transfer domain to be used to characterize compressed channel state information (CSI) for a first layer and a second number of coefficients in the transfer domain to be used to characterize the compressed CSI for a second layer; and receive information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients.

In some aspects, a non-transitory computer-readable medium may store one or more instructions for wireless communication. The one or more instructions, when executed by one or more processors of a base station, may cause the one or more processors to receive, from a user equipment (UE), a report that indicates a first number of coefficients in a transfer domain to be used to characterize compressed channel state information (CSI) for a first layer and a second number of coefficients in the transfer domain to be used to characterize the compressed CSI for a second layer; and receive information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients.

In some aspects, an apparatus for wireless communication may include means for receiving, from a user equipment (UE), a report that indicates a first number of coefficients in a transfer domain to be used to characterize compressed channel state information (CSI) for a first layer and a second number of coefficients in the transfer domain to be used to characterize the compressed CSI for a second layer; and means for receiving information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients.

In some aspects, a method of wireless communication, performed by a base station, may include receiving, from a user equipment (UE), a report that indicates: a first quantization scheme to be used to interpret a first set of coefficients that characterize compressed channel state information (CSI) for a first layer, and a second quantization scheme to be used to interpret a second set of coefficients that characterize the compressed CSI for the second layer; and receiving information that identifies the first set of coefficients and the second set of coefficients.

In some aspects, a base station for wireless communication may include memory and one or more processors operatively coupled to the memory. The memory and the one or more processors may be configured to receive, from a user equipment (UE), a report that indicates: a first quantization scheme to be used to interpret a first set of coefficients that characterize compressed channel state information (CSI) for a first layer, and a second quantization scheme to be used to interpret a second set of coefficients that characterize the compressed CSI for the second layer; and receive information that identifies the first set of coefficients and the second set of coefficients.

In some aspects, a non-transitory computer-readable medium may store one or more instructions for wireless communication. The one or more instructions, when executed by one or more processors of a base station, may cause the one or more processors to receive, from a user equipment (UE), a report that indicates: a first quantization scheme to be used to interpret a first set of coefficients that characterize compressed channel state information (CSI) for a first layer, and a second quantization scheme to be used to interpret a second set of coefficients that characterize the compressed CSI for the second layer; and receive information that identifies the first set of coefficients and the second set of coefficients.

In some aspects, an apparatus for wireless communication may include means for receiving, from a user equipment (UE), a report that indicates: a first quantization scheme to be used to interpret a first set of coefficients that characterize compressed channel state information (CSI) for a first layer, and a second quantization scheme to be used to interpret a second set of coefficients that characterize the compressed CSI for the second layer; and means for receiving information that identifies the first set of coefficients and the second set of coefficients.

In some aspects, a method of wireless communication, performed by a base station, may include determining at least one of: a first number of coefficients to be included in a first set of coefficients in a transfer domain that characterize compressed channel state information (CSI) for a first layer, or a first quantization scheme to be used to interpret the first set of coefficients in the transfer domain; determining at least one of: a second number of coefficients to be included in a second set of coefficients in the transfer domain that characterize the compressed CSI for a second layer, or a second quantization scheme to be used to interpret the second set of coefficients in the transfer domain; receiving, from a user equipment (UE), a report that identifies the first set of coefficients and the second set of coefficients; and interpreting the report based at least in part on determining at least one of the first number of coefficients or the first quantization scheme, and based at least in part on determining at least one of the second number of coefficients or the second quantization scheme.

In some aspects, a base station for wireless communication may include memory and one or more processors operatively coupled to the memory. The memory and the one or more processors may be configured to determine at least one of: a first number of coefficients to be included in a first set of coefficients in a transfer domain that characterize compressed channel state information (CSI) for a first layer, or a first quantization scheme to be used to interpret the first set of coefficients in the transfer domain; determine at least one of: a second number of coefficients to be included in a second set of coefficients in the transfer domain that characterize the compressed CSI for a second layer, or a second quantization scheme to be used to interpret the second set of coefficients in the transfer domain; receive, from a user equipment (UE), a report that identifies the first set of coefficients and the second set of coefficients; and interpret the report based at least in part on determining at least one of the first number of coefficients or the first quantization scheme, and based at least in part on determining at least one of the second number of coefficients or the second quantization scheme.

In some aspects, a non-transitory computer-readable medium may store one or more instructions for wireless communication. The one or more instructions, when executed by one or more processors of a base station, may cause the one or more processors to determine at least one of: a first number of coefficients to be included in a first set of coefficients in a transfer domain that characterize compressed channel state information (CSI) for a first layer, or a first quantization scheme to be used to interpret the first set of coefficients in the transfer domain; determine at least one of: a second number of coefficients to be included in a second set of coefficients in the transfer domain that characterize the compressed CSI for a second layer, or a second quantization scheme to be used to interpret the second set of coefficients in the transfer domain; receive, from a user equipment (UE), a report that identifies the first set of coefficients and the second set of coefficients; and interpret the report based at least in part on determining at least one of the first number of coefficients or the first quantization scheme, and based at least in part on determining at least one of the second number of coefficients or the second quantization scheme.

In some aspects, an apparatus for wireless communication may include means for determining at least one of: a first number of coefficients to be included in a first set of coefficients in a transfer domain that characterize compressed channel state information (CSI) for a first layer, or a first quantization scheme to be used to interpret the first set of coefficients in the transfer domain; means for determining at least one of: a second number of coefficients to be included in a second set of coefficients in the transfer domain that characterize the compressed CSI for a second layer, or a second quantization scheme to be used to interpret the second set of coefficients in the transfer domain; means for receiving, from a user equipment (UE), a report that identifies the first set of coefficients and the second set of coefficients; and means for interpreting the report based at least in part on determining at least one of the first number of coefficients or the first quantization scheme, and based at least in part on determining at least one of the second number of coefficients or the second quantization scheme.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
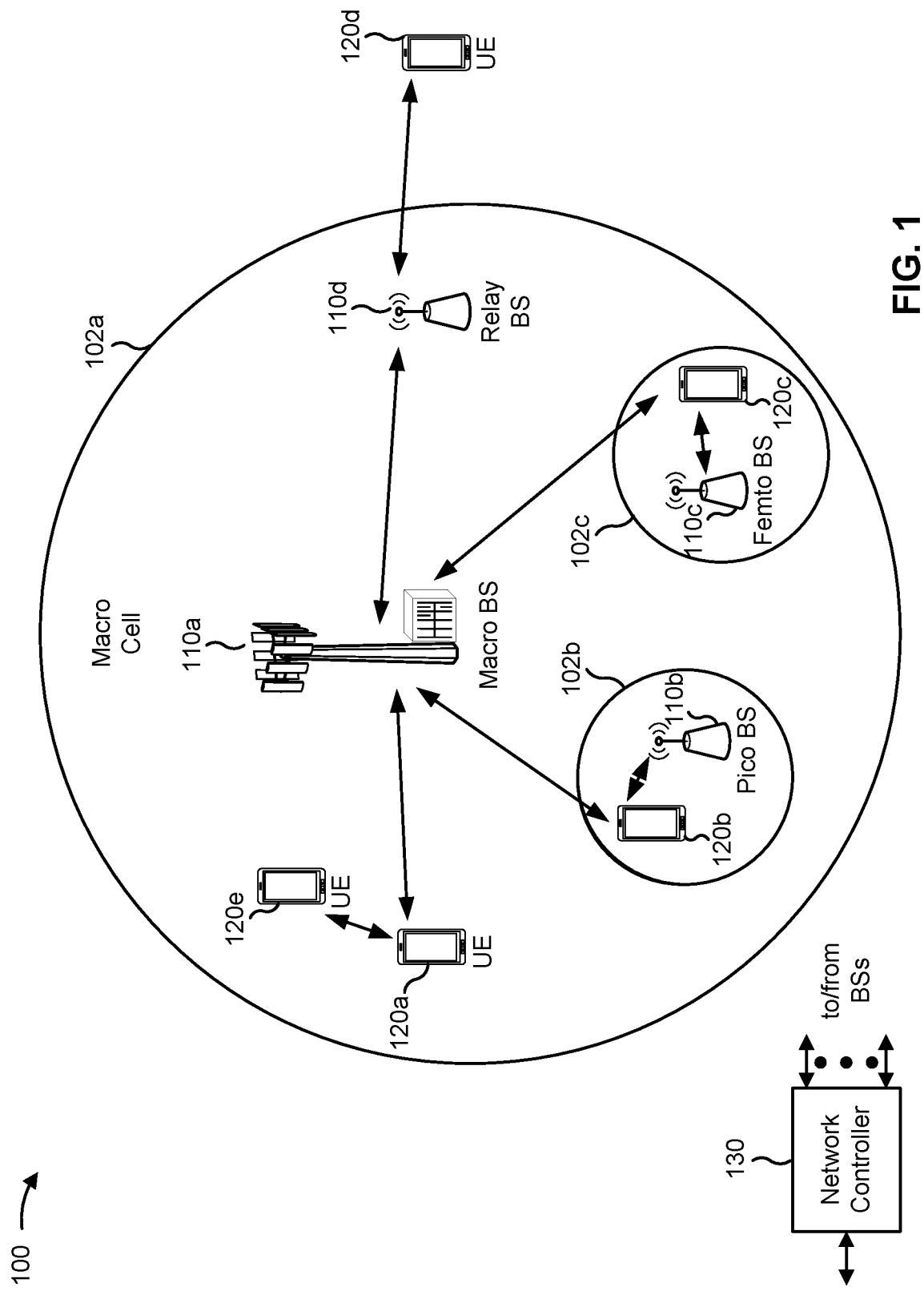
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
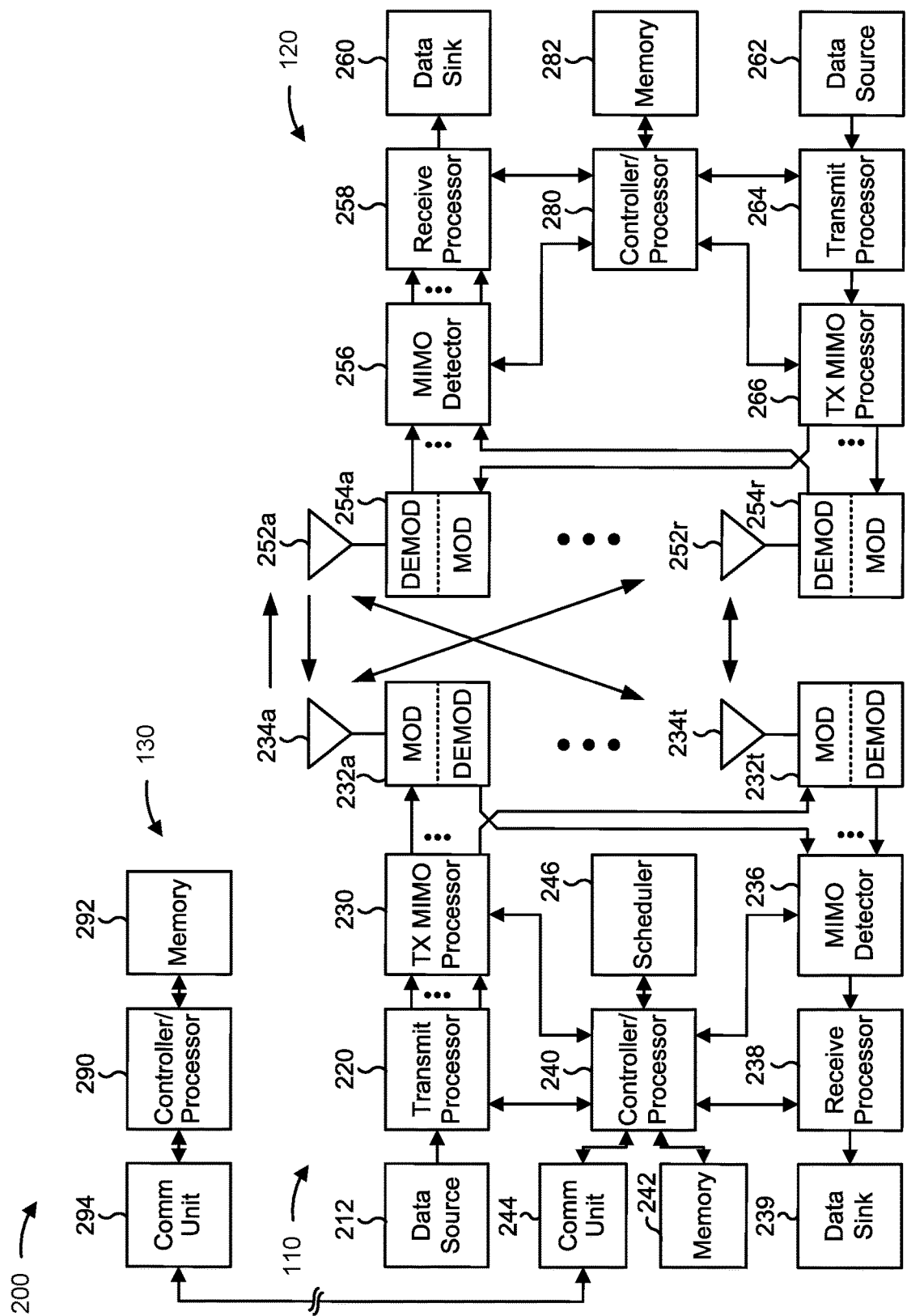
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with layer-specific coefficient quantity and/or quantization scheme reporting for Type II channel state information compression, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, process 900 of FIG. 9, process 1000 of FIG. 10, process 1100 of FIG. 11, process 1200 of FIG. 12, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for transmitting, to a base station, a report that indicates a first number of coefficients in a transfer domain to be used to characterize compressed channel state information (CSI) for a first layer and a second number of coefficients in the transfer domain to be used to characterize the compressed CSI for a second layer; means for transmitting information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients; and/or the like. Additionally, or alternatively, UE 120 may include means for transmitting, to a base station, a report that indicates: a first quantization scheme to be used to interpret a first set of coefficients that characterize compressed channel state information (CSI) for a first layer, and a second quantization scheme to be used to interpret a second set of coefficients that characterize the compressed CSI for the second layer; means for transmitting information that identifies the first set of coefficients and the second set of coefficients; and/or the like. Additionally, or alternatively, UE 120 may include means for determining at least one of: a first number of coefficients to be included in a first set of coefficients in a transfer domain that characterize compressed channel state information (CSI) for a first layer, or a first quantization scheme to be used to interpret the first set of coefficients in the transfer domain; means for determining at least one of: a second number of coefficients to be included in a second set of coefficients in the transfer domain that characterize the compressed CSI for a second layer, or a second quantization scheme to be used to interpret the second set of coefficients in the transfer domain; means for transmitting a report that identifies the first set of coefficients and the second set of coefficients based at least in part on determining at least one of the first number of coefficients or the first quantization scheme, and based at least in part on determining at least one of the second number of coefficients or the second quantization scheme; and/or the like. In some aspects, such means may include one or more components of UE 120 described in connection with FIG. 2.

In some aspects, base station 110 may include means for receiving, from a user equipment (UE), a report that indicates a first number of coefficients in a transfer domain to be used to characterize compressed channel state information (CSI) for a first layer and a second number of coefficients in the transfer domain to be used to characterize the compressed CSI for a second layer; means for receiving information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients; and/or the like. Additionally, or alternatively, base station 110 may include means for receiving, from a user equipment (UE), a report that indicates: a first quantization scheme to be used to interpret a first set of coefficients that characterize compressed channel state information (CSI) for a first layer, and a second quantization scheme to be used to interpret a second set of coefficients that characterize the compressed CSI for the second layer; means for receiving information that identifies the first set of coefficients and the second set of coefficients; and/or the like. Additionally, or alternatively, base station 110 may include means for determining at least one of: a first number of coefficients to be included in a first set of coefficients in a transfer domain that characterize compressed channel state information (CSI) for a first layer, or a first quantization scheme to be used to interpret the first set of coefficients in the transfer domain; means for determining at least one of: a second number of coefficients to be included in a second set of coefficients in the transfer domain that characterize the compressed CSI for a second layer, or a second quantization scheme to be used to interpret the second set of coefficients in the transfer domain; means for receiving, from a user equipment (UE), a report that identifies the first set of coefficients and the second set of coefficients; means for interpreting the report based at least in part on determining at least one of the first number of coefficients or the first quantization scheme, and based at least in part on determining at least one of the second number of coefficients or the second quantization scheme; and/or the like. In some aspects, such means may include one or more components of base station 110 described in connection with FIG. 2.

As indicated above, FIG. 2 is provided as an example. Other examples may differ from what is described with regard to FIG. 2.

Figure 3:
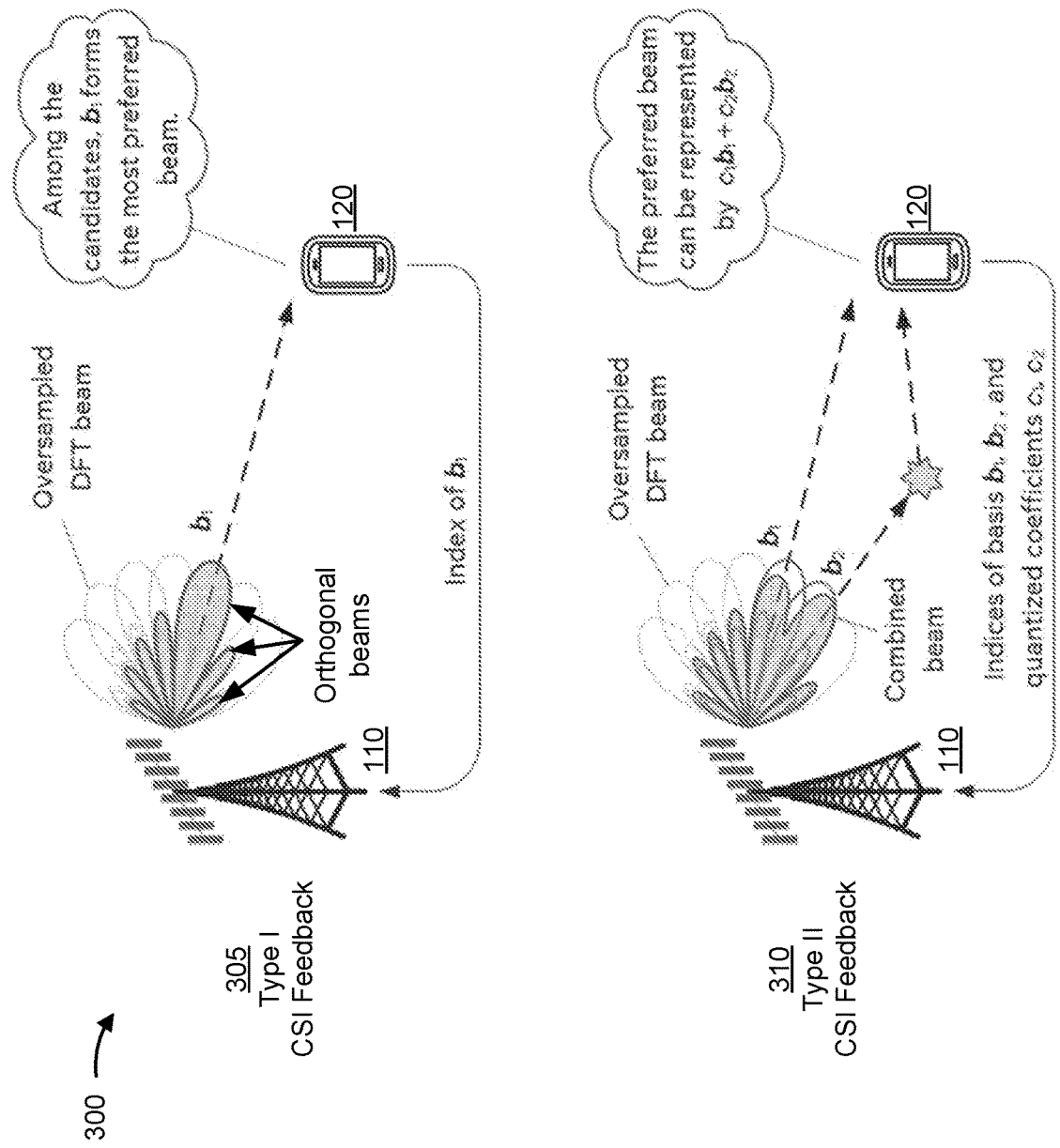
FIG. 3 is a diagram illustrating an example of Type I channel state information feedback and Type II channel state information feedback, in accordance with various aspects of the present disclosure.

FIG. 3 is a diagram illustrating an example 300 of Type I channel state information feedback and Type II channel state information feedback, in accordance with various aspects of the present disclosure.

As shown by reference number 305, in Type I channel state information (CSI) feedback, a codebook for CSI may define a set of discrete Fourier transform (DFT) beams in the spatial domain. In some aspects, each beam in the set of beams is orthogonal with the other beams in the set of beams. In some aspects, a beam may be represented by a DFT vector, and/or may be identified by a beam index (e.g., $b_1$, $b_2$, and so on). A base station 110 may transmit CSI reference signals (CSI-RSs) for the set of beams in the codebook, and a UE 120 may measure the CSI-RS for a set of candidate beams (e.g., one or more beams in the codebook). The UE 120 may select the best beam among the set of candidate beams (shown as $b_1$ in FIG. 3) based at least in part on the measurements. The UE 120 may transmit CSI feedback (e.g., in a CSI report) to indicate the selected beam to the base station 110. For example, the selected beam may be indicated using a precoding matrix indicator (PMI). However, using Type I CSI feedback may limit the spatial resolution of beams (e.g., candidate beams may be limited to the beams in the codebook) and may result in selection of a worse beam than could otherwise be used (e.g., by linearly combining multiple DFT vectors corresponding to different beams, as described below). The UE 120 and the base station 110 may use the selected beam to communicate.

As shown by reference number 310, in Type II CSI feedback, a codebook for CSI may include multiple oversampled DFT beams, which may not all be orthogonal with one another. In some aspects, the beams included in the codebook may be separated into multiple groups of orthogonal beams. The UE 120 may measure CSI-RSs, may select a group (e.g., the best group) based at least in part on the measurements, and may analyze different linear combinations of two or more beams in the group. The UE 120 may determine whether any of the linear combinations form a beam with better spatial resolution than a single beam in the group. If so, the UE 120 may transmit CSI feedback (e.g., in a CSI report) that indicates the beam indexes of the selected beams to be combined (shown as $b_1$ and $b_2$ in FIG. 3) and the linear combination coefficients (shown as $c_1$ for beam $b_1$ and $c_2$ for beam $b_2$ in FIG. 3) to be applied to each selected beam to form the beam with the better spatial resolution. The UE 120 and/or the base station 110 may configure a beam using the indicated beam indexes and linear combination coefficients (sometimes referred to herein as "coefficients"), and may communicate via the configured beam.

In some aspects, the UE 120 may report CSI feedback for multiple sub-bands (e.g., each sub-band via which the UE 120 is capable of communicating with the base station 110). In this case, the UE 120 may report beam indexes and corresponding coefficients for multiple sub-bands (e.g., each sub-band). In some aspects, the beam indexes may be common across sub-bands, but different sub-bands may be associated with different coefficients (e.g., different amplitude coefficients, different phase coefficients, and/or the like). As a result, Type II CSI feedback may consume more overhead than Type I CSI feedback, but may result in a better beam used for communications (e.g., thereby resulting in higher throughput, lower latency, less likelihood of beam failure, and/or the like). To reduce the overhead used for Type II CSI feedback, the UE 120 and/or the base station 110 may employ Type II CSI compression, as described below in connection with FIG. 4.

As indicated above, FIG. 3 is provided as an example. Other examples may differ from what is described with regard to FIG. 3.

Figure 4:
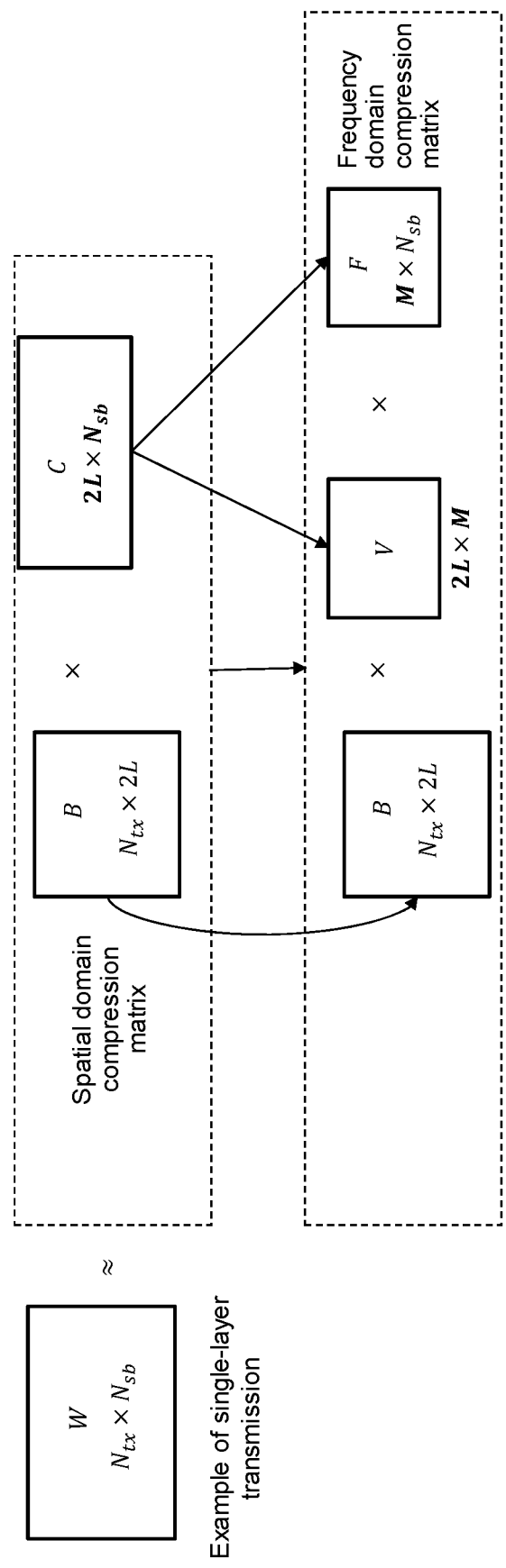
FIG. 4 is a diagram illustrating an example of Type II channel state information compression, in accordance with various aspects of the present disclosure.

FIG. 4 is a diagram illustrating an example 400 of Type II channel state information compression, in accordance with various aspects of the present disclosure.

As shown in FIG. 4, the UE 120 may apply transfer domain compression to the CSI feedback to reduce the overhead of Type II CSI feedback. For example, a precoding matrix W may be represented by a spatial domain compression matrix B multiplied by a frequency domain coefficient matrix C in order to report a linear combination of DFT beams for a particular sub-band, and corresponding coefficients for multiple sub-bands or frequencies, as described above in connection with FIG. 3. The frequency domain coefficient matrix C may have a size based at least in part on a number of beams for which CSI is to be reported (e.g., L beams, with 2 polarizations per beam, represented by 2L) and a number of sub-bands for which CSI is to be reported ($N_{sb}$). Reporting values of frequency domain coefficient matrix C may result in significant overhead, especially when the number of sub-bands ($N_{sb}$) is large.

In some aspects, the UE 120 may transfer the frequency domain coefficient matrix C into a transfer domain coefficient matrix V multiplied by a frequency domain compression matrix F. The frequency domain compression matrix F may represent the frequencies or sub-bands for which CSI is to be reported, and the size of the frequency domain compression matrix F may be based at least in part on a number of transfer domain bases M and the number of sub-bands $N_{sb}$.

The transfer domain coefficient matrix V may represent coefficients in a transfer domain, which may be transferred from the frequency domain represented in frequency domain coefficient matrix C, such as by applying DFT, discrete cosine transform (DCT), inverse fast Fourier transform (IFFT), or another transform function to the frequency domain coefficient matrix C. The size of the transfer domain coefficient matrix V may be based at least in part on a number of beams for which CSI is to be reported (e.g., L beams, with 2 polarizations per beam, represented by 2L) and a number of transfer domain bases M (e.g., used when applying the transform function).

In some aspects, the coefficients in transfer domain coefficient matrix V may represent the time domain taps (e.g., channel taps, which may represent time delay of a signal) of the coefficients in frequency domain coefficient matrix C. In some cases, the channel characteristics in the time domain may be sparse. In this case, the number of non-zero coefficients (e.g., dominant coefficients) in transfer domain coefficient matrix V may be sparse. In some aspects, the UE 120 may report only non-zero coefficients, for each beam, included in transfer domain coefficient matrix V, thereby reducing overhead in Type II CSI feedback as compared to reporting frequency domain coefficient matrix C.

In some aspects, the UE 120 may report CSI feedback for multiple layers (e.g., multiple MIMO layers) to support MIMO communications. In this case, the UE 120 may generate a transfer domain coefficient matrix V for each layer (e.g. based at least in part on measuring CSI-RSs), and may report non-zero coefficients from transfer domain coefficient matrix V for each layer. However, different layers may have different numbers of non-zero (e.g., dominant) coefficients in respective transfer domain coefficient matrices. For example, leading layers associated with stronger channel gains may require a smaller number of non-zero coefficients to characterize CSI feedback (e.g., PMI, a PMI matrix, and/or the like) in the transfer domain because a dominant tap may be associated with a smaller number of beams for a leading layer (e.g., when frequency selectivity for the layer is low). Conversely, later layers associated with weaker channel gains may require a larger number of non-zero coefficients to characterize CSI in the transfer domain because a dominant tap may be associated with a larger number of beams for a later layer (e.g., when frequency selectivity for the layer is high). Furthermore, for leading layers, a range of values of the transfer domain coefficients may be smaller, while for later layers, a range of values of the transfer domain coefficients may be larger.

Because different layers may be associated with different numbers of transfer domain coefficients (e.g., non-zero or dominant coefficients in the transfer domain coefficient matrix V) to characterize compressed CSI, the UE 120 may need to indicate, to a base station 110, a number of transfer domain coefficients to be reported by the UE 120 for each layer. Without such reporting, and if the same number of coefficients are assumed and/or used for each layer, compression of CSI may result in less accurate beam configuration (e.g., less accurate beam construction from multiple DFT beams and corresponding coefficients, reported as transfer domain coefficients).

Some techniques and apparatuses described herein enable a UE 120 to report layer-specific coefficient quantities (e.g., an indication of a number of coefficients that the UE 120 reports for each layer), thereby enabling the UE 120 to report different numbers of transfer domain coefficients for different layers. The base station 110 may interpret reported CSI according to the layer-specific coefficient quantities indicated by the UE 120, thereby enabling more accurate beam configuration. Furthermore, some techniques and apparatuses described herein permit such reporting with low overhead. Furthermore, some techniques and apparatuses described herein enable the UE 120 to report layer-specific quantization schemes (e.g., an indication of a quantization scheme used by the UE 120 for each layer), such as different ranges between quantization points, different numbers of bits used for quantization, and/or the like. This may reduce overhead by reducing a number of bits needed to represent quantized values when a common quantization scheme is used for all layers, and/or may improve accuracy of beam configuration (e.g., for a same number of reported bits). Additional details are described below.

As indicated above, FIG. 4 is provided as an example. Other examples may differ from what is described with regard to FIG. 4.

Figure 5:
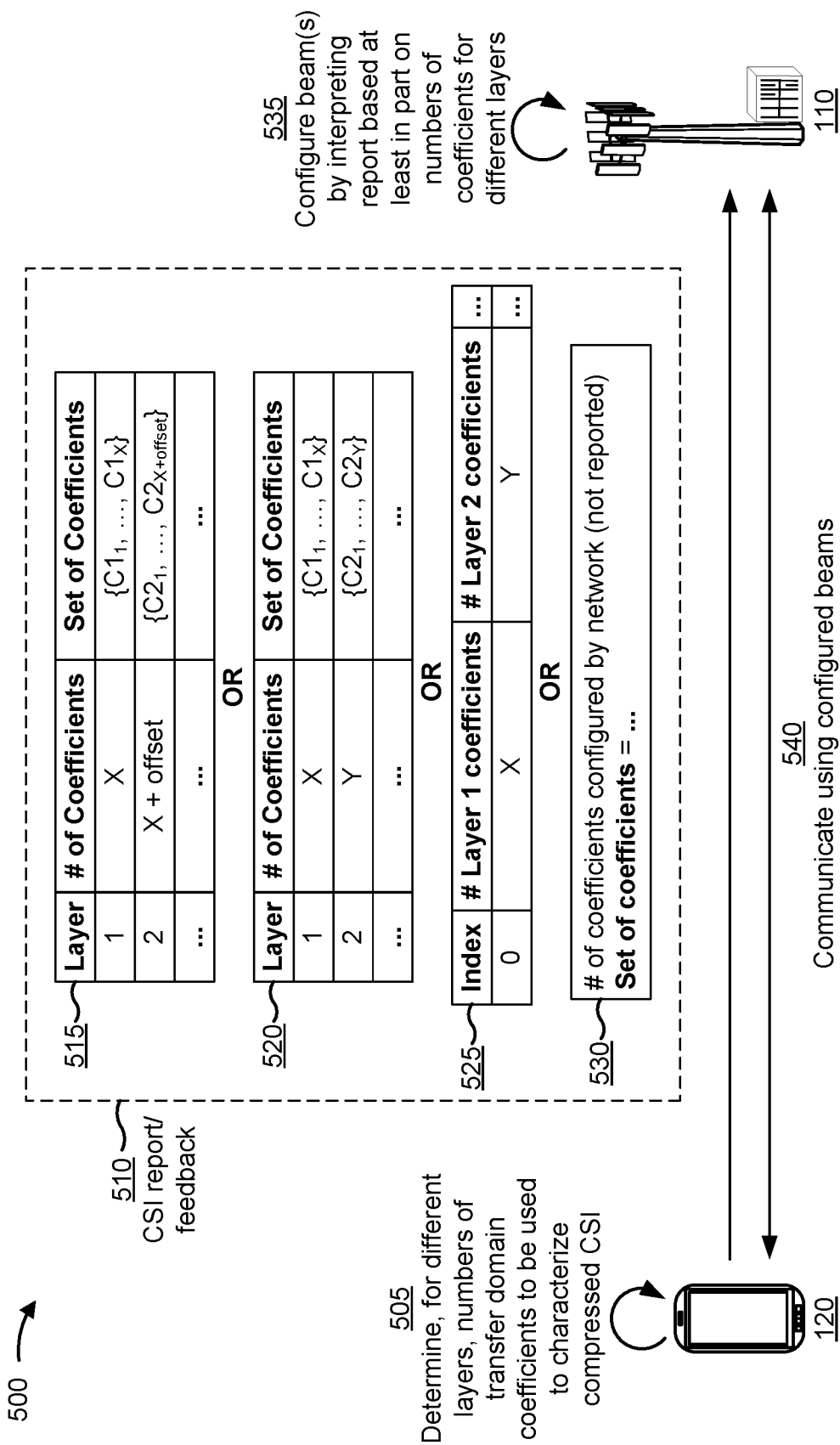
FIG. 5 is a diagram illustrating an example of layer-specific coefficient quantity reporting for Type II channel state information compression, in accordance with various aspects of the present disclosure.

FIG. 5 is a diagram illustrating an example 500 of layer-specific coefficient quantity reporting for Type II channel state information compression, in accordance with various aspects of the present disclosure.

As shown in FIG. 5, a UE 120 and a base station 110 may communicate with one another. As shown by reference number 505, the UE 120 may determine, for different layers, numbers of transfer domain coefficients (e.g., coefficients in the transfer domain, such as coefficients in the transfer domain coefficient matrix V) to be used to characterize compressed CSI. In some aspects, the UE 120 may determine a number of transfer domain coefficients (sometimes referred to herein as a "number of coefficients") for each layer of a multi-layer communication. In some aspects, different layers may be associated with different numbers of coefficients, as described above. For example, a first layer (e.g., a leading layer) may be associated with a smaller number of coefficients, and a second layer (e.g., a later layer) may be associated with a larger number of coefficients, as described above. In some aspects, different layers may be associated with the same number of coefficients.

In some aspects, the UE 120 may determine a number of transfer domain coefficients for a layer based at least in part on a rank indication (RI) value associated with the layer. A rank indication value may indicate a maximum number of layers permitted to be used for communications. For example, the UE 120 may determine a first number of coefficients for a first layer, a second number of coefficients for a second layer, and/or the like, based at least in part on an RI value associated with the first layer, the second layer, and/or the like. In some aspects, the UE 120 may determine the number of coefficients for a layer based at least in part on a relationship between the rank indication value and the number of coefficients for the layer. In some aspects, the relationship may be predetermined (e.g., according to a wireless communication standard). Additionally, or alternatively, the relationship may be preconfigured for the UE 120 (e.g., stored and/or hard coded in memory of the UE 120). Additionally, or alternatively, the relationship may be signaled to the UE 120 by the base station 110 in a signaling message, such as a radio resource control (RRC) message, downlink control information (DCI), a media access control (MAC) control element (CE) (MAC-CE), and/or the like.

In some aspects, a larger number of coefficients may be used for a layer when the layer is associated with a smaller rank indication (RI) value, and a smaller number of coefficients may be used for a layer when the layer is associated with a larger RI value. In some aspects, the RI value is included in the CSI report so that the UE 120 can indicate, to the base station 110, a preference for a number of layers to be used for downlink communications. In some aspects, the UE 120 may report a set of coefficients for CSI compression for each layer in the preferred number of layers. Thus, the compression level may depend on the value of the rank indication. For example, for a lower RI value, there may be less uplink overhead associated with reporting compressed CSI because there are fewer layers for which the number of coefficients need to be reported. In this case, the compression may be less aggressive and may use a larger number of coefficients to achieve a more accurate beam. For a high RI value, there may be more uplink overhead associated with reporting compressed CSI because there are more layers for which the number of coefficients needs to be reported. In this case, the compression may be more aggressive and may use a smaller number of coefficients to use less overhead. In some aspects, the UE 120 may transmit the RI value in a report to the base station 110, described in more detail below.

As shown by reference number 510, the UE 120 may transmit a report to the base station 110. The report may be, for example, a CSI report, CSI feedback, and/or the like. The report may indicate, for each layer, a corresponding number of transfer domain coefficients to be used to characterize compressed CSI for a corresponding layer. For example, the report may indicate a first number of transfer domain coefficients to be used to characterize compressed CSI for a first layer, a second number of coefficients to be used to characterize compressed CSI for a second layer, and so on (e.g., for multiple layers, for each layer to be used for communications between the UE 120 and the base station 110, and/or the like).

As further shown, the UE 120 may report, for each layer, a corresponding set of transfer domain coefficients that characterize compressed CSI for a corresponding layer. For example, the UE 120 may indicate a first set of transfer domain coefficients that characterize compressed CSI for a first layer, a second set of transfer domain coefficients that characterize compressed CSI for a second layer, and so on (e.g., for multiple layers, for each layer to be used for communications between the UE 120 and the base station 110, and/or the like). The first set of transfer domain coefficients may include the first number of coefficients reported by the UE 120 (e.g., the number of coefficients included in the first set may be equal to the first number), the second set of transfer domain coefficients may include the second number of coefficients reported by the UE 120, and so on. In some aspects, the numbers of coefficients and the sets of coefficients may be indicated in the same report. In some aspects, the numbers of coefficients and the sets of coefficients may be indicated in different reports. Additionally, or alternatively, an RI value may be indicated in the same or a different report as the numbers of coefficients and/or the sets of coefficients.

As shown by reference number 515, in some aspects, the UE 120 may use differential reporting to indicate the numbers of coefficients corresponding to each layer. For example, the UE 120 may explicitly identify, in the report, the first number of coefficients corresponding to the first layer (e.g., using a bit value that equals the first number). In example 500, using differential reporting, the UE 120 indicates that the first layer (shown as Layer 1) includes X coefficients. As further shown, the UE 120 indicates a first set of coefficients corresponding to the first layer, shown as $C1_1$ through $C1_X$.

In some aspects, the UE 120 may determine a first number of bits to be used to indicate the first number of coefficients for the first layer. In some aspects, the UE 120 may indicate the first number of bits in the report (e.g., the first number of coefficients may be represented by the first number of bits). In some aspects, the UE 120 may determine the first number of bits based at least in part on a dimension of a transfer domain coefficient matrix V (e.g., a coefficient matrix that is based at least in part on DFT bases, DCT bases, and/or the like), a number of beams for which the compressed CSI is to be reported (e.g., L or 2L) for the first layer, a number of transfer domain bases associated with the report (e.g., M) for the first layer, an upper bound on the number of coefficients for the first layer, and/or the like.

For example, the UE 120 may determine the first number of bits corresponding to the first layer based at least in part on a ceiling function applied to a binary logarithm of a multiplication result between the number of beams for which the compressed CSI is to be reported (e.g., a number of beams associated with the first layer) and the number of transfer domain bases associated with the report (e.g., a number of transfer domain bases associated with the first layer). For example, the UE 120 may determine the first number of bits using the function $\lceil \log_2 K_0 \rceil$, where $K_0$ is determined based at least in part on the dimensions of the transfer domain coefficient matrix V for the first layer (described above in connection with FIG. 4). For example, $K_0$ may be equal to or based at least in part on a result of multiplying the number of beams for which compressed CSI is to be reported (e.g., a first dimension of the transfer domain coefficient matrix V for the first layer, such as 2L) and the number of transfer domain bases associated with the report (e.g., a second dimension of transfer domain coefficient matrix V for the first layer, such as M). The UE 120 may calculate a binary logarithm (e.g., $\log_2$ or log base 2) of $K_0$ (e.g., the multiplication result of the number of beams and the number of transfer domain bases), and may apply a ceiling function to the result (e.g., to round up to the nearest integer that is greater than the result) to determine the first number of bits.

Alternatively, the UE 120 may determine the first number of bits corresponding to the first layer based at least in part on a ceiling function applied to a binary logarithm of an upper bound on the number of coefficients for the first layer (e.g., an upper bound on the first number of coefficients). For example, the UE 120 may determine the number of bits using the function $\lceil \log_2 \overline{K}_0 \rceil$ where $\overline{K}_0$ is an upper bound on the first number of coefficients for the first layer. In some aspects, the upper bound may be predetermined (e.g., according to a wireless communication standard). Additionally, or alternatively, the upper bound may be preconfigured for the UE 120 (e.g., stored in memory of the UE 120). Additionally, or alternatively, the upper bound may be signaled to the UE 120 by the base station 110 in a signaling message, such as an RRC message, DCI, a MAC-CE, and/or the like. The UE 120 may calculate a binary logarithm (e.g., $\log_2$ or log base 2) of $\overline{K}_0$ (e.g., the upper bound), and may apply a ceiling function to the result (e.g., to round up to the nearest integer that is greater than the result) to determine the first number of bits.

Using differential reporting, the UE 120 may indicate the second number of coefficients for the second layer by indicating a relationship between the second number and the first number. For example, in some aspects, the UE 120 may indicate that the first number and the second number are the same. Alternatively, the UE 120 may indicate an offset between the first number and the second number. The offset may indicate, for example, a difference between the first number and the second number. In example 500, using differential reporting, the UE 120 indicates that the second layer (shown as Layer 2) includes X+offset coefficients. As further shown, the UE 120 indicates a second set of coefficients corresponding to the second layer, shown as $C2_1$ through $C2_{X+offset}$.

In some aspects, the UE 120 may determine the number of bits for a layer (e.g., an $n^{th}$ layer, a layer other than the first layer, and/or the like) based at least in part on a number of states for a number of coefficients for the layer (e.g., a number of states of coefficient number changes compared to a previous layer or a reference layer). For example, the UE 120 may determine the number of bits for a layer based at least in part on a ceiling function applied to a binary logarithm of the number of states. For example, the UE 120 may determine the number of bits using the function $\lceil \log_2 K_n \rceil$, where $K_n$ is the number of states. The UE 120 may calculate a binary logarithm (e.g., $\log_2$ or log base 2) of $K_n$ (e.g., the number of states), and may apply a ceiling function to the result (e.g., to round up to the nearest integer that is greater than the result) to determine the number of bits. In some aspects, $K_n$ may be predetermined, preconfigured, or indicated to the UE 120 in a signaling message.

In some aspects, a first state of $K_n$ (e.g., a value used to indicate the number of coefficients of layer n as compared to a reference number of coefficients of a reference layer, such as the first layer) may indicate that the $n^{th}$ layer uses the same number of coefficients as are used by a reference layer (e.g., the $(n-1)^{th}$ layer). Additionally, or alternatively, an $k_n^{th}$ state of $K_n$ (e.g., a $k_n^{th}$ value) may indicate that the $n^{th}$ layer uses a number of coefficients that is $k_n \times B$ greater than a reference layer (e.g., the $(n-1)^{th}$ layer). In some aspects, $k_n$ may be referred to as a first value, and may be indicated in the report. In some aspects, B may be referred to as second value, and may be predetermined, preconfigured, and/or indicated to the UE 120 in a signaling message. For example, the offset between the second number of coefficients (e.g., or the number of coefficients for layer n) and the first number of coefficients (e.g., or the number of coefficients for layer n−1) may be determined by multiplying the first value and the second value. In some aspects, $K_n$ may represent an upper bound of the first value (e.g., a number of states that the first value $k_n$ can represent).

In some aspects, the first layer, for which the number of coefficients is explicitly reported, may be referred to as a reference layer. The UE 120 may explicitly indicate, in the report, the number of coefficients to be used to characterize compressed CSI for the reference layer. For non-reference layers (e.g., other than the reference layer), the UE 120 may indicate a relationship between a number of coefficients to be used for the non-reference layer (e.g., layer n) and either a number of coefficients used for the reference layer (e.g., a reference number of coefficients) or a number of coefficients used for a different non-reference layer (e.g., a preceding layer n−1).

In some cases, using differential reporting may use less overhead (e.g., by using fewer bits) to indicate the second number (and subsequent numbers) using the offset as compared to explicitly identifying the second number in the report.

As shown by reference number 520, in some aspects, the UE 120 may use explicit reporting to indicate the numbers of coefficients corresponding to each layer. For example, the UE 120 may explicitly identify the first number of coefficients corresponding to the first layer (e.g., using a first bit value that equals the first number), may explicitly identify the second number of coefficients corresponding to the second layer (e.g., using a second bit value that equals the second number), and so on (e.g., for multiple layers, for each layer to be used for communications between the UE 120 and the base station 110, and/or the like). In example 500, using explicit reporting, the UE 120 indicates that the first layer (shown as Layer 1) includes X coefficients and indicates that the second layer (shown as Layer 2) includes Y coefficients. As further shown, the UE 120 indicates a first set of coefficients corresponding to the first layer, shown as $C1_1$ through $C1_X$, and indicates a second set of coefficients corresponding to the second layer, shown as $C2_1$ through $C2_Y$.

In some aspects, the UE 120 may determine a number of bits to be used to indicate the number of coefficients for a layer based at least in part on a dimension of a transfer domain coefficient matrix V (e.g., a coefficient matrix that is based at least in part on DFT bases, DCT bases, and/or the like), a number of beams for which the compressed CSI is to be reported (e.g., L or 2L), a number of transfer domain bases associated with the report (e.g., M), an upper bound on the number of coefficients for the layer, and/or the like.

For example, the UE 120 may determine a number of bits corresponding to a layer based at least in part on a ceiling function applied to a binary logarithm of a multiplication result between the number of beams for which the compressed CSI is to be reported (e.g., for the layer) and the number of transfer domain bases associated with the report (e.g., for the layer). For example, the UE 120 may determine the number of bits using the function $\lceil \log_2 K_0 \rceil$, where $K_0$ is determined based at least in part on the dimensions of the transfer domain coefficient matrix V generated for the layer (described above in connection with FIG. 4). For example, $K_0$ may be equal to or based at least in part on a result of multiplying the number of beams for which compressed CSI is to be reported (e.g., a first dimension of transfer domain coefficient matrix V for the layer, such as 2L) and the number of transfer domain bases associated with the report (e.g., a second dimension of transfer domain coefficient matrix V for the layer, such as M). The UE 120 may calculate a binary logarithm (e.g., $\log_2$ or log base 2) of $K_0$ (e.g., the multiplication result of the number of beams and the number of transfer domain bases), and may apply a ceiling function to the result (e.g., to round up to the nearest integer that is greater than the result) to determine the number of bits.

Alternatively, the UE 120 may determine a number of bits corresponding to a layer based at least in part on a ceiling function applied to a binary logarithm of the upper bound on the number of coefficients for the layer. For example, the UE 120 may determine the number of bits using the function $\lceil \log_2 \overline{K}_{0,n} \rceil$, where $\overline{K}_{0,n}$ is an upper bound on the number of coefficients for layer n. In some aspects, the upper bound may be predetermined (e.g., according to a wireless communication standard). Additionally, or alternatively, the upper bound may be preconfigured for the UE 120 (e.g., stored in memory of the UE 120). Additionally, or alternatively, the upper bound may be signaled to the UE 120 by the base station 110 in a signaling message, such as an RRC message, DCI, a MAC-CE, and/or the like. In some aspects, different layers may have the same upper bound. In some aspects, different layers may be different upper bounds. The UE 120 may calculate a binary logarithm (e.g., $\log_2$ or log base 2) of $\overline{K}_{0,n}$ (e.g., the upper bound), and may apply a ceiling function to the result (e.g., to round up to the nearest integer that is greater than the result) to determine the number of bits.

In some cases, using explicit reporting may use more overhead than other techniques described herein, but may be less complex to implement, thereby requiring less processing resources, memory resources, battery power, and/or the like for the UE 120 and/or the base station 110. Furthermore, explicit reporting may allow for greater flexibility in configuring the number of coefficients for different layers as compared to other techniques described herein.

As shown by reference number 525, in some aspects, the UE 120 may use combination reporting (e.g., index-based reporting) to indicate the numbers of coefficients corresponding to each layer. For example, the UE 120 may include an index value in the report, and the index value may correspond to an entry in a table. The table may include multiple entries (e.g., rows), and each entry may represent a relationship between an index value and a corresponding plurality of numbers of coefficients for different layers. For example, a first index value may indicate a first set of values for the numbers of coefficients for multiple layers, a second index value may indicate a second set of values for numbers of coefficients for multiple layers, and so on. Thus, the table may store information that indicates relationships between a plurality of index values and a corresponding plurality of sets of numbers of coefficients for a plurality of layers. In some aspects, each set of numbers includes a number of coefficients for one or more layers of the plurality of layers (e.g., a first number of coefficients for a first layer, a second number of coefficients for a second layer, and/or the like).

In example 500, using combination reporting, the UE 120 indicates an index value of 0, which corresponds to an entry in a table that indicates that the first layer (shown as Layer 1) includes X coefficients and that the second layer (shown as Layer 2) includes Y coefficients. As described elsewhere herein, the UE 120 may also indicate a first set of coefficients corresponding to the first layer (e.g., $C1_1$ through $C1_X$) and a second set of coefficients corresponding to the second layer (e.g., $C2_1$ through $C2_Y$).

In some aspects, the table may be stored by the UE 120 and/or the base station 110. In some aspects, the table (e.g., the entries and/or information in the table) may be predetermined (e.g., according to a wireless communication standard). Additionally, or alternatively, the table may be preconfigured for the UE 120 (e.g., stored in memory of the UE 120). Additionally, or alternatively, the table may be signaled to the UE 120 by the base station 110 in a signaling message, such as an RRC message, DCI, a MAC-CE, and/or the like. In some aspects, different entries may be associated with the same number of layers. In some aspects, different entries may be associated with different numbers of layers (e.g., to cover different rank indication values). In some aspects, different tables may be used for different numbers of layers (e.g., different rank indication values).

In some aspects, the UE 120 may determine a number of bits to be used to indicate the index value based at least in part on a ceiling function applied to a binary logarithm of a size of the table (e.g., a length of the table, one or more dimensions of the table, a number of rows in the table, a number of entries in the table, and/or the like). In some aspects, the size of the table may be based at least in part on a number of combinations of numbers of coefficients for different layers. In some aspects, the UE 120 may determine the number of bits of the index value using the function $\lceil \log_2 T \rceil$, where T represents the size of the table. Thus, the UE 120 may calculate a binary logarithm of T (e.g., the size of the table), and may apply a ceiling function to the result (e.g., to round up to the nearest integer that is greater than the result) to determine the number of bits for the index value. As indicated above, the size of the table may be predetermined, preconfigured for the UE 120, and/or indicated to the UE 120 in a signaling message.

In some cases, using combination reporting may conserve overhead compared to other techniques described herein due to less information being reported (e.g., reporting only a single value that indicates combinations of numbers of coefficients for multiple layers), but may be less flexible than other techniques described herein because only combinations included in the table may be used.

As shown by reference number 530, in some aspects, the UE 120 may use a network configuration to determine the numbers of coefficients corresponding to each layer. For example, the numbers of coefficients to be used for different layers may be indicated to the UE 120 by the base station 110. For example, the numbers of coefficients may be indicated in a signaling message, such as an RRC message, DCI, a MAC-CE, and/or the like. In this case, the UE 120 may refrain from reporting the numbers of coefficients (e.g., the numbers of coefficients may be excluded from the report). The UE 120 may report the sets of coefficients for each layer based at least in part on the numbers of coefficients configured by the network (e.g., the base station 110). In some aspects, the base station 110 may indicate number(s) of coefficients for a subset of layers (e.g., the first layer, the first two layers, and/or the like), and the UE 120 may determine and report the number(s) of coefficients for the remaining layers.

In some aspects, the UE 120 may indicate (e.g., in the report) whether the same number of coefficients is used for all layers. For example, the report may include a single bit that indicates whether the same number of coefficients is used for all layers. In this case, a first value of the bit may indicate that the same number of coefficients is used for all layers, and a second value of the bit may indicate that the same number of coefficients is not used for all layers (e.g., that at least two layers are associated with different numbers of coefficients). If the UE 120 indicates that the same number of coefficients is used for all layers, then the UE 120 may indicate that number. Additionally, or alternatively, the UE 120 need not separately report the number of coefficients for each layer (e.g., the UE 120 does not need to perform one or more operations described above in association with differential reporting, explicit reporting, combination reporting, and/or the like). If the UE 120 indicates that the same number of coefficients is not used for all layers, then the UE 120 may report the numbers of coefficients for each layer, as described above (e.g., using differential reporting, explicit reporting, combination reporting, and/or the like).

In some aspects, the indication of whether the same number of coefficients is used for all layers may be included in first CSI feedback and/or a first CSI report that has a fixed payload size (e.g., a CSI Part I report). Additionally, or alternatively, the indication of the number(s) of coefficients to be used for each layer may be included in second CSI feedback and/or a second CSI report that has a dynamic payload size (e.g., a CSI Part II report).

As shown by reference number 535, the base station 110 may configure one or more beams based at least in part on interpreting the report(s) from the UE 120. For example, the base station 110 may use the indicated number of coefficients for a layer to determine how to interpret bits, associated with that layer, in the report. For example, the base station 110 may interpret the bits to determine the set of coefficients, where the set of coefficients includes the indicated number of coefficients. The base station 110 may use the set of coefficients (and corresponding beams indicated in a spatial domain compression matrix), to configure one or more beams to be used for communications with the UE 120.

As shown by reference number 540, the UE 120 and the base station 110 may communicate via the configured beam(s). For example, the UE 120 and the base station 110 may communicate uplink information, downlink information, and/or the like.

Although some operations are described herein in connection with layer-specific coefficient quantity reporting, in some aspects, the UE 120 may use code block (CB)-specific coefficient quantity reporting. In this case, the UE 120 may determine number(s) of coefficients corresponding to different code blocks, and may report the number(s) of coefficients and the sets of coefficients corresponding to different code blocks. In some aspects, a layer may be included in a set of layers associated with the same code block, and the same number of coefficients may be used to characterize compressed CSI for each layer included in the set of layers.

For example, a first layer may be included in a first set of layers associated with a first code block, a second layer may be included in a second set of layers associated with a second code block, and so on (e.g., for multiple layers, for each layer, and/or the like). In some aspects, a first number of coefficients is used to characterize compressed CSI for each layer included in the first set of layers (e.g., each layer in the first set of layers is associated with the same first number of coefficients), a second number of coefficients is used to characterize compressed CSI for each layer included in the second set of layers (e.g., each layer in the second set of layers is associated with the same second number of coefficients), and so on. In this way, the UE 120 may use CB-specific coefficient quantity reporting, in a similar manner as described above in connection with layer-specific coefficient quantity reporting.

As indicated above, FIG. 5 is provided as an example. Other examples may differ from what is described with regard to FIG. 5.

Figure 6:
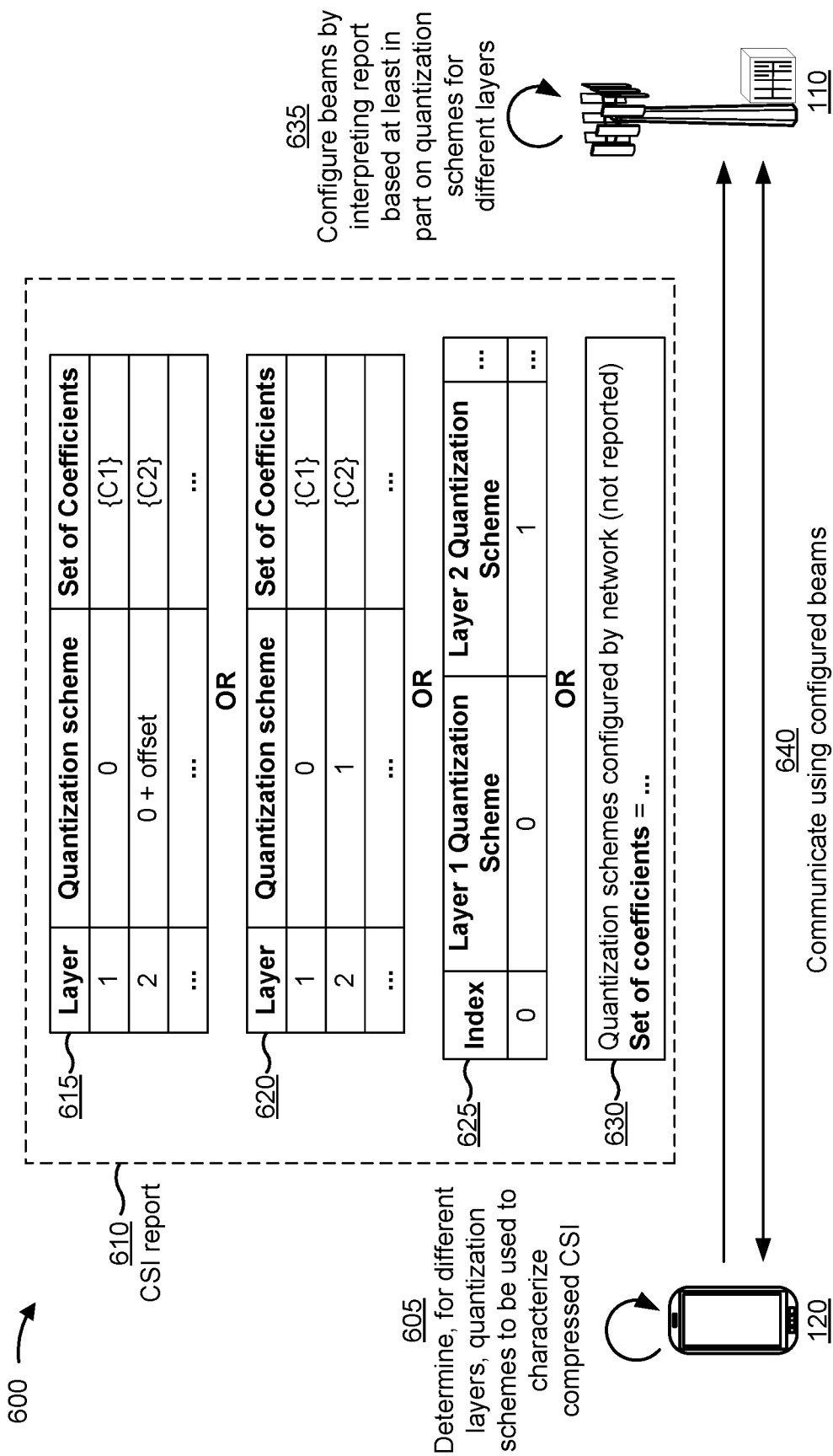
FIG. 6 is a diagram illustrating an example of layer-specific quantization scheme reporting for Type II channel state information compression, in accordance with various aspects of the present disclosure.

FIG. 6 is a diagram illustrating an example 600 of layer-specific quantization scheme reporting for Type II channel state information compression, in accordance with various aspects of the present disclosure.

As shown in FIG. 6, a UE 120 and a base station 110 may communicate with one another. As shown by reference number 605, the UE 120 may determine, for different layers, quantization schemes to be used to interpret corresponding sets of coefficients that characterize compressed CSI. In some aspects, the UE 120 may determine a quantization scheme for each layer of a multi-layer communication. In some aspects, different layers may be associated with different quantization schemes. In some aspects, different layers may be associated with the same quantization scheme.

In some aspects, a quantization scheme may indicate a difference between adjacent quantized coefficients represented by adjacent (e.g., consecutive) bit values. For example, a bit value of zero may indicate a first coefficient value, a bit value of one may indicate a second coefficient value, a bit value of two may indicate a third coefficient value, and so on. In some aspects, the quantization scheme may indicate the coefficient values corresponding to each bit value. Additionally, or alternatively, the quantization scheme may indicate a difference between quantized coefficients represented by adjacent bit values, such as a difference between the first coefficient value (represented by a bit value of zero) and the second coefficient value (represented by a bit value of one), a difference between the second coefficient value (represented by a bit value of one) and the third coefficient value (represented by a bit value of two), and/or the like. In some aspects, the difference between adjacent coefficient values represented by adjacent bit values may be the same for all adjacent coefficient values. Alternatively, different pairs of adjacent coefficient values may have different differences between them.

Additionally, or alternatively, a quantization scheme may indicate a number of bits to be used to quantize a determined coefficient value (e.g., for each coefficient value in a set of coefficients). For example, a quantization scheme for a layer may indicate that two bits are used to quantize each coefficient value reported for a layer (e.g., a more granular quantization), that three bits are used to quantize each coefficient value reported for a layer (e.g., a less granular quantization), and/or the like. In some aspects, each coefficient value in the set of coefficients for a layer may be quantized using the same number of bits. Alternatively, different coefficient values in the set of coefficients for a layer may be quantized using different numbers of bits.

Additionally, or alternatively, a quantization scheme for a layer may correspond to a number of coefficients to be used to characterize compressed CSI for the layer. Thus, the UE 120 may indicate a quantization scheme for a layer by indicating a number of coefficients for the layer, such as by using one or more reporting techniques described above in connection with FIG. 5. Additionally, or alternatively, the UE 120 may indicate a number of coefficients for a layer by reporting a quantization scheme for the layer.

In some aspects, a quantization scheme may be indicated and/or represented using an index value (e.g., a quantization scheme index value). For example, a first quantization scheme may be indicated using a first index value, a second quantization scheme may be indicated using a second index value, and so on. In some aspects, the index value may be selected from a plurality of index values, which may be predetermined, preconfigured, and/or indicated to the UE 120 by the base station 110 in a signaling message. In some aspects, different index values may indicate different differences between adjacent quantized coefficients represented by adjacent bit values, different numbers of bits used to quantize a set of coefficients, different numbers of coefficients, and/or the like.

In some aspects, the UE 120 may determine a quantization scheme for a layer based at least in part on a rank indication (RI) value associated with the layer, in a similar manner as described above in connection with FIG. 5. For example, the UE 120 may determine a first quantization scheme for a first layer, a second quantization scheme for a second layer, and/or the like, based at least in part on an RI value associated with the first layer, the second layer, and/or the like. In some aspects, the UE 120 may determine the quantization scheme for a layer based at least in part on a relationship between the rank indication value and the quantization scheme for the layer. In some aspects, the relationship may be predetermined, preconfigured and/or signaled to the UE 120 by the base station 110 in a signaling message, as described elsewhere herein.

In some aspects, a larger number of bits may be used for quantization for a layer when the layer is associated with a smaller RI value, and a smaller number of bits may be used for quantization for a layer when the layer is associated with a larger RI value. Thus, the CSI compression level may depend on the value of the rank indication. For example, for a lower RI value, there may be less uplink overhead associated with reporting compressed CSI because there are fewer layers for which the number of coefficients need to be reported. In this case, the compression may be less aggressive and may use a more detailed and/or finer level of quantization to achieve a more accurate beam. For a high RI value, there may be more uplink overhead associated with reporting compressed CSI because there are more layers for which the number of coefficients needs to be reported. In this case, the compression may be more aggressive and may use less detailed and/or coarser level of quantization to use less overhead. In some aspects, the UE 120 may transmit the RI value in a report to the base station 110, described in more detail below.

As shown by reference number 610, the UE 120 may transmit a report to the base station 110. The report may be, for example, a CSI report, CSI feedback, and/or the like. The report may indicate, for each layer, a corresponding quantization scheme to be used to indicate and/or interpret a set of coefficients that characterize compressed CSI for a corresponding layer. For example, the report may indicate a first quantization scheme for a first layer, a second quantization scheme for a second layer, and so on (e.g., for multiple layers, for each layer to be used for communications between the UE 120 and the base station 110, and/or the like).

As further shown, the UE 120 may report, for each layer, a corresponding set of transfer domain coefficients that characterize compressed CSI for a corresponding layer. For example, the UE 120 may indicate a first set of transfer domain coefficients that characterize compressed CSI for a first layer, a second set of transfer domain coefficients that characterize compressed CSI for a second layer, and so on (e.g., for multiple layers, for each layer to be used for communications between the UE 120 and the base station 110, and/or the like). The first set of transfer domain coefficients may be quantized using the first quantization scheme reported by the UE 120, the second set of transfer domain coefficients may be quantized using the first quantization scheme reported by the UE 120, and so on. In some aspects, the quantization schemes and the sets of coefficients may be indicated in the same report. In some aspects, quantization schemes and the sets of coefficients may be indicated in different reports. Additionally, or alternatively, an RI value may be indicated in the same or a different report as the quantization schemes and/or the sets of coefficients.

As shown by reference number 615, in some aspects, the UE 120 may use differential reporting to indicate the quantization schemes corresponding to each layer. For example, the UE 120 may explicitly identify, in the report, the first quantization scheme corresponding to the first layer (e.g., using a bit value that equals quantization scheme index value). In example 600, using differential reporting, the UE 120 indicates that the first layer (shown as Layer 1) is associated with quantization scheme 0 (e.g., a quantization scheme index value of 0). As further shown, the UE 120 indicates a first set of coefficients corresponding to the first layer, shown as {C1} (e.g., which may include one or more coefficients).

Using differential reporting, the UE 120 may indicate the second quantization scheme for the second layer by indicating a relationship between the second quantization scheme (e.g., an index value of the second quantization scheme) and the first quantization scheme (e.g., an index value of the first quantization scheme). For example, in some aspects, the UE 120 may indicate that the first quantization scheme and the second quantization scheme are the same. Alternatively, the UE 120 may indicate an offset between the first quantization scheme index value and the second quantization scheme index value. The offset may indicate, for example, a difference between the first quantization scheme index value and the second quantization scheme index value. In example 600, using differential reporting, the UE 120 indicates that the second layer (shown as Layer 2) is associated with quantization scheme 0+offset (e.g., a quantization scheme index value of 0+offset). As further shown, the UE 120 indicates a second set of coefficients corresponding to the second layer, shown as {C2} (e.g., which may include one or more coefficients).

In some aspects, the UE 120 may determine the number of bits to be used to indicate a quantization scheme for a layer (e.g., an $n^{th}$ layer, a layer other than the first layer, and/or the like) based at least in part on a number of states for a quantization scheme for the layer (e.g., a number of states of quantization scheme index value changes compared to a previous layer or a reference layer). For example, the UE 120 may determine the number of bits for a layer based at least in part on a ceiling function applied to a binary logarithm of the number of states. For example, the UE 120 may determine the number of bits using the function $\lceil \log_2 Q_n \rceil$, where $Q_n$ is the number of states of the quantization scheme. The UE 120 may calculate a binary logarithm (e.g., $\log_2$ or log base 2) of $Q_n$ (e.g., the number of states), and may apply a ceiling function to the result (e.g., to round up to the nearest integer that is greater than the result) to determine the number of bits. In some aspects, $Q_n$ may be predetermined, preconfigured, or indicated to the UE 120 in a signaling message.

In some aspects, a first state of $Q_n$ (e.g., a value used to indicate the quantization scheme of layer n as compared to a reference quantization scheme of a reference layer, such as the first layer) may indicate that the $n^{th}$ layer uses the same quantization scheme is are used by a reference layer (e.g., the $(n-1)^{th}$ layer). Additionally, or alternatively, an $q_n^{th}$ state of $Q_n$ (e.g., a $q_n^{th}$ value) may indicate that the $n^{th}$ layer uses a quantization scheme having an index value that is $q_n \times I$ greater than a quantization scheme index value corresponding to a reference layer (e.g., the $(n-1)^{th}$ layer). In some aspects, $q_n$ may be referred to as a first value, and may be indicated in the report. In some aspects, I may be referred to as second value, and may be predetermined, preconfigured, and/or indicated to the UE 120 in a signaling message. For example, the offset between the second quantization scheme index value (e.g., or the quantization scheme index value for layer n) and the first quantization scheme index value (e.g., or the quantization scheme index value for layer n−1) may be determined by multiplying the first value and the second value. In some aspects, $Q_n$ may represent an upper bound of the first value (e.g., a number of states that the first value $q_n$ can represent).

In some aspects, the first layer, for which the quantization scheme is explicitly reported, may be referred to as a reference layer. The UE 120 may explicitly indicate, in the report, the quantization scheme to be used for the reference layer. For non-reference layers (e.g., other than the reference layer), the UE 120 may indicate a relationship between a quantization scheme index value to be used for the non-reference layer (e.g., layer n) and either a quantization scheme index value used for the reference layer (e.g., a reference quantization scheme) or a quantization scheme index value used for a different non-reference layer (e.g., a preceding layer n−1).

In some cases, using differential reporting may use less overhead (e.g., by using fewer bits) to indicate the second quantization scheme (and subsequent quantization schemes) using the offset as compared to explicitly identifying the second quantization scheme in the report.

As shown by reference number 620, in some aspects, the UE 120 may use explicit reporting to indicate the quantization schemes corresponding to each layer. For example, the UE 120 may explicitly identify the first quantization scheme corresponding to the first layer (e.g., using a first bit value that equals the first quantization scheme index value), may explicitly identify the second quantization scheme corresponding to the second layer (e.g., using a second bit value that equals the second quantization scheme index value), and so on (e.g., for multiple layers, for each layer to be used for communications between the UE 120 and the base station 110, and/or the like). In example 600, using explicit reporting, the UE 120 indicates that the first layer (shown as Layer 1) is associated with quantization scheme 0 (e.g., a quantization scheme index value of 0) and indicates that the second layer (shown as Layer 2) is associated with quantization scheme 1 (e.g., a quantization scheme index value of 1). As further shown, the UE 120 indicates a first set of coefficients corresponding to the first layer, shown as {C1} (e.g., which may include one or more coefficients), and indicates a second set of coefficients corresponding to the second layer, shown as {C2}.

In some cases, using explicit reporting may use more overhead than other techniques described herein, but may be less complex to implement, thereby requiring less processing resources, memory resources, battery power, and/or the like for the UE 120 and/or the base station 110. Furthermore, explicit reporting may allow for greater flexibility in configuring the quantization schemes for different layers as compared to other techniques described herein.

As shown by reference number 625, in some aspects, the UE 120 may use combination reporting (e.g., index-based reporting) to indicate the quantization schemes corresponding to each layer. For example, the UE 120 may include an index value in the report, and the index value may correspond to an entry in a table. The table may include multiple entries (e.g., rows), and each entry may represent a relationship between an index value and a corresponding plurality of quantization schemes for different layers. For example, a first index value may indicate a first set of quantization schemes for multiple layers, a second index value may indicate a second set of quantization schemes for multiple layers, and so on. Thus, the table may store information that indicates relationships between a plurality of index values and a corresponding plurality of sets of quantization schemes for a plurality of layers. In some aspects, each set of quantization schemes includes a quantization scheme for one or more layers of the plurality of layers (e.g., a first quantization scheme for a first layer, a second quantization scheme for a second layer, and/or the like).

In example 600, using combination reporting, the UE 120 indicates an index value of 0, which corresponds to an entry in a table that indicates that the first layer (shown as Layer 1) is associated with quantization scheme 0 (e.g., a quantization scheme index value of 0) and indicates that the second layer (shown as Layer 2) is associated with quantization scheme 1 (e.g., a quantization scheme index value of 1). As described elsewhere herein, the UE 120 may also indicate a first set of coefficients corresponding to the first layer (e.g., {C1}) and a second set of coefficients corresponding to the second layer (e.g., {C2}).

In some aspects, the table may be stored by the UE 120 and/or the base station 110. In some aspects, the table (e.g., the entries and/or information in the table) may be predetermined (e.g., according to a wireless communication standard). Additionally, or alternatively, the table may be preconfigured for the UE 120 (e.g., stored in memory of the UE 120). Additionally, or alternatively, the table may be signaled to the UE 120 by the base station 110 in a signaling message, such as an RRC message, DCI, a MAC-CE, and/or the like. In some aspects, different entries may be associated with the same number of layers. In some aspects, different entries may be associated with different numbers of layers (e.g., to cover different rank indication values). In some aspects, different tables may be used for different numbers of layers (e.g., different rank indication values).

In some aspects, the UE 120 may determine a number of bits to be used to indicate the index value based at least in part on a ceiling function applied to a binary logarithm of a size of the table, in a similar manner as described above in connection with FIG. 5.

In some cases, using combination reporting may conserve overhead compared to other techniques described herein due to less information being reported (e.g., reporting only a single value that indicates combinations of numbers of coefficients for multiple layers), but may be less flexible than other techniques described herein because only combinations included in the table may be used.

As shown by reference number 630, in some aspects, the UE 120 may use a network configuration to determine the quantization schemes corresponding to each layer. For example, the quantization schemes to be used for different layers may be indicated to the UE 120 by the base station 110. For example, the quantization schemes may be indicated in a signaling message, such as an RRC message, DCI, a MAC-CE, and/or the like. In this case, the UE 120 may refrain from reporting the quantization schemes (e.g., the quantization schemes may be excluded from the report). The UE 120 may report the sets of coefficients for each layer based at least in part on the quantization schemes configured by the network (e.g., the base station 110). In some aspects, the base station 110 may indicate quantization scheme(s) for a subset of layers (e.g., the first layer, the first two layers, and/or the like), and the UE 120 may determine and report the quantization scheme(s) for the remaining layers.

In some aspects, the UE 120 may indicate (e.g., in the report) whether the same quantization scheme is used for all layers. For example, the report may include a single bit that indicates whether the same quantization scheme is used for all layers. In this case, a first value of the bit may indicate that the same quantization scheme is used for all layers, and a second value of the bit may indicate that the same quantization scheme is not used for all layers (e.g., that at least two layers are associated with different quantization schemes). If the UE 120 indicates that the same quantization scheme is used for all layers, then the UE 120 may indicate that quantization scheme. Additionally, or alternatively, the UE 120 need not separately report the quantization schemes for each layer (e.g., the UE 120 does not need to perform one or more operations described above in association with differential reporting, explicit reporting, combination reporting, and/or the like). If the UE 120 indicates that the same quantization scheme is not used for all layers, then the UE 120 may report the quantization schemes for each layer, as described above (e.g., using differential reporting, explicit reporting, combination reporting, and/or the like).

In some aspects, the indication of whether the same quantization scheme is used for all layers may be included in first CSI feedback and/or a first CSI report that has a fixed payload size (e.g., a CSI Part I report). Additionally, or alternatively, the indication of the quantization scheme(s) to be used for each layer may be included in second CSI feedback and/or a second CSI report that has a dynamic payload size (e.g., a CSI Part II report).

As shown by reference number 635, the base station 110 may configure one or more beams based at least in part on interpreting the report(s) from the UE 120. For example, the base station 110 may use the indicated quantization scheme for a layer to determine how to interpret bits, associated with that layer, in the report. For example, the base station 110 may interpret the bits to determine the set of coefficients, where the set of coefficients are determined based at least in part on the quantization scheme. The base station 110 may use the set of coefficients (and corresponding beams indicated in a spatial domain compression matrix), to configure one or more beams to be used for communications with the UE 120.

As shown by reference number 640, the UE 120 and the base station 110 may communicate via the configured beam(s). For example, the UE 120 and the base station 110 may communicate uplink information, downlink information, and/or the like.

Although some operations are described herein in connection with layer-specific quantization scheme reporting, in some aspects, the UE 120 may use code block (CB)-specific quantization scheme reporting. In this case, the UE 120 may determine quantization scheme(s) corresponding to different code blocks, and may report the quantization scheme(s) and the sets of coefficients corresponding to different code blocks. In some aspects, a layer may be included in a set of layers associated with the same code block, and the same quantization scheme may be used for each layer included in the set of layers.

For example, a first layer may be included in a first set of layers associated with a first code block, a second layer may be included in a second set of layers associated with a second code block, and so on (e.g., for multiple layers, for each layer, and/or the like). In some aspects, a first quantization scheme is used to determine and/or interpret coefficients that characterize compressed CSI for each layer included in the first set of layers (e.g., each layer in the first set of layers is associated with the same first quantization scheme), a second quantization scheme is used to determine and/or interpret coefficients that characterize compressed CSI for each layer included in the second set of layers (e.g., each layer in the second set of layers is associated with the same second quantization scheme), and so on. In this way, the UE 120 may use CB-specific quantization scheme reporting, in a similar manner as described above in connection with layer-specific quantization scheme reporting.

In some aspects, the techniques described in connection with FIG. 6 may be used in association with the techniques described in connection with FIG. 5. For example, the UE 120 may determine a first number of coefficients and/or a first quantization scheme associated with a first layer, may determine a second number of coefficients and/or a second quantization scheme associated with a second layer, and/or the like. The UE 120 may transmit one or more reports that identify a first set of coefficients (e.g., that includes the first number of coefficients and/or that is quantized using the first quantization scheme), a second set of coefficients (e.g., that includes the second number of coefficients and/or that is quantized using the second quantization scheme), and/or the like. When the UE 120 is configured to report the number(s) of coefficients and/or the quantization scheme(s), such information may be included in the report. In some aspects, the number(s) of coefficients and/or the quantization scheme(s) may be indicated to the UE 120 by the base station 110, in which case the UE 120 may exclude such information from the report.

As indicated above, FIG. 6 is provided as an example. Other examples may differ from what is described with regard to FIG. 6.

Figure 7:
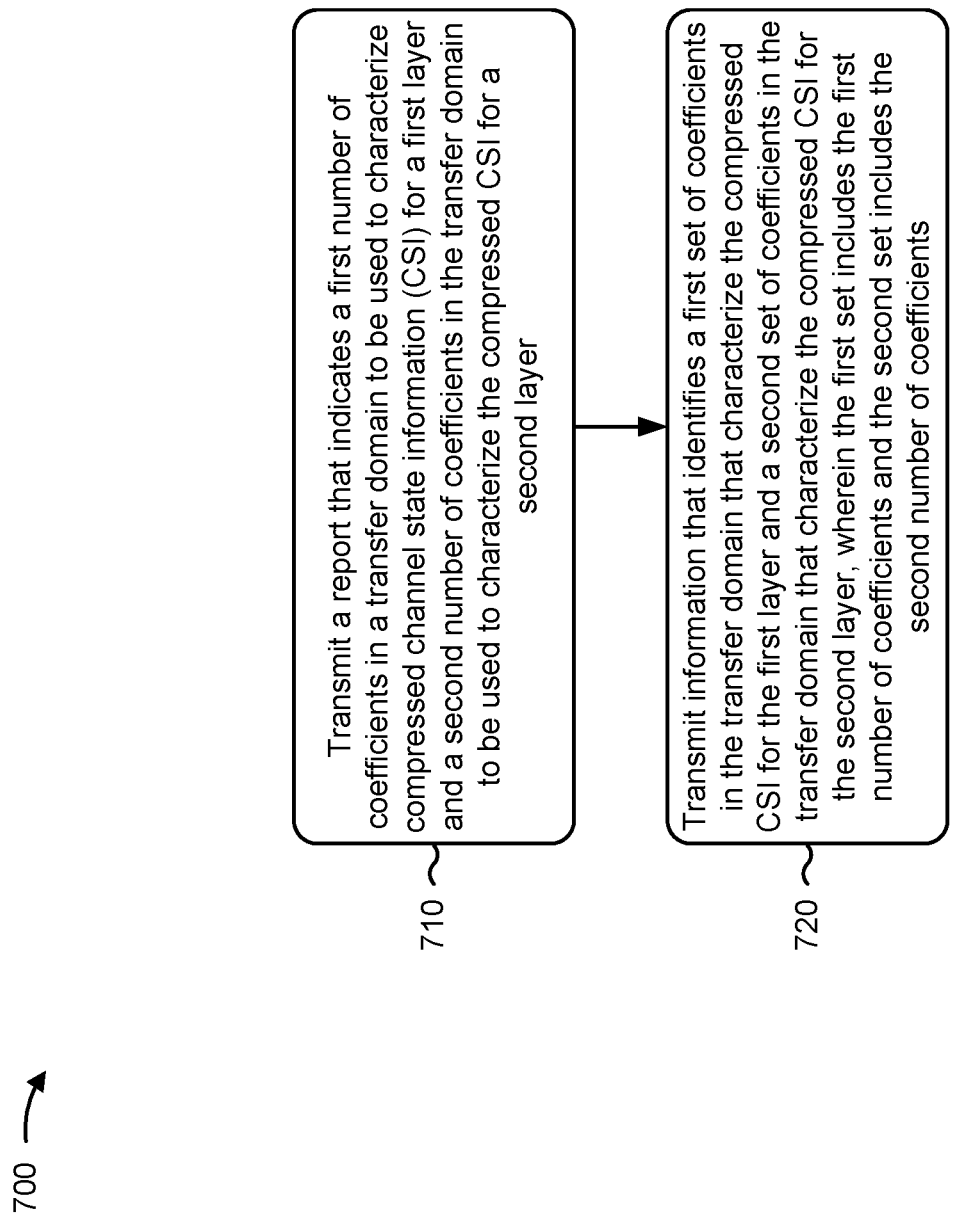
FIGS. 7-12 are diagrams illustrating example processes relating to layer-specific coefficient quantity and/or quantization scheme reporting for Type II channel state information compression, in accordance with various aspects of the present disclosure.

FIG. 7 is a diagram illustrating an example process 700 performed, for example, by a UE, in accordance with various aspects of the present disclosure. Example process 700 is an example where a UE (e.g., UE 120 and/or the like) performs operations associated with layer-specific coefficient quantity and/or quantization scheme reporting for Type II channel state information compression.

As shown in FIG. 7, in some aspects, process 700 may include transmitting, to a base station, a report that indicates a first number of coefficients in a transfer domain to be used to characterize compressed channel state information (CSI) for a first layer and a second number of coefficients in the transfer domain to be used to characterize the compressed CSI for a second layer (block 710). For example, the UE (e.g., using controller/processor 280, transmit processor 264, TX MIMO processor 266, MOD 254, antenna 252, and/or the like) may transmit, to a base station, a report that indicates a first number of coefficients in a transfer domain to be used to characterize compressed CSI for a first layer and a second number of coefficients in the transfer domain to be used to characterize the compressed CSI for a second layer, as described above.

As further shown in FIG. 7, process 700 may include transmitting information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients (block 720). For example, the UE (e.g., using controller/processor 280, transmit processor 264, TX MIMO processor 266, MOD 254, antenna 252, and/or the like) may transmit information that identifies a first set of coefficients in the transfer domain that characterize the compressed CSI for the first layer and a second set of coefficients in the transfer domain that characterize the compressed CSI for the second layer, as described above. In some aspects, the first set includes the first number of coefficients and the second set includes the second number of coefficients.

Process 700 may include additional aspects, such as any single aspect and/or any combination of aspects described below and/or in connection with one or more other processes described elsewhere herein.

In some aspects, at least one of the first number of coefficients or the second number of coefficients is determined based at least in part on a rank indication value associated with the first layer and the second layer. In some aspects, the first number of coefficients is a larger number when the rank indication value is smaller. In some aspects, the first number of coefficients is a smaller number when the rank indication value is larger. In some aspects, the rank indication value is transmitted in the report.

In some aspects, the at least one of the first number of coefficients or the second number of coefficients is determined based at least in part on a relationship between the rank indication value and the at least one of the first number of coefficients or the second number of coefficients. In some aspects, the relationship is predetermined, preconfigured, or signaled to the UE using at least one of a radio resource control message or downlink control information.

In some aspects, the first number of coefficients and the second number of coefficients are different. In some aspects, process 700 includes reporting whether a same number of coefficients is used for all layers. In some aspects, a single bit is used to indicate whether the same number of coefficients is used for all layers. In some aspects, the second number of coefficients is greater than the first number of coefficients.

In some aspects, the report indicates a first number of bits used to represent the first number of coefficients. In some aspects, the first number of bits is determined based at least in part on at least one of: a dimension of a coefficient matrix that is based at least in part on discrete Fourier transform (DFT) bases or discrete cosine transform (DCT) bases, a number of beams for which the compressed CSI is to be reported, a number of transfer domain bases associated with the report, an upper bound on the first number of coefficients, or a combination thereof. In some aspects, the first number of bits is determined based at least in part on a ceiling function applied to a binary logarithm of a multiplication result between the number of beams for which the compressed CSI is to be reported and the number of transfer domain bases associated with the report. In some aspects, the first number of bits is determined based at least in part on a ceiling function applied to a binary logarithm of the upper bound on the first number of coefficients. In some aspects, the upper bound is predetermined, preconfigured, or signaled to the UE.

In some aspects, the first number is explicitly identified in the report. In some aspects, the second number is indicated using an indication of a relationship between the first number and the second number. In some aspects, the indication of the relationship includes at least one of: an indication that the first number and the second number are the same, or an indication of an offset. In some aspects, the offset indicates a difference between the first number and the second number. In some aspects, the offset is determined based at least in part on a multiplication result between a first value and a second value. In some aspects, the first value is included in the report and the second value is predetermined, preconfigured, or signaled to the UE using at least one of a radio resource control message or downlink control information. In some aspects, a number of bits used to indicate the relationship is determined based at least in part on a ceiling function applied to a binary logarithm of an upper bound of the first value. In some aspects, the upper bound of the first value is predetermined, preconfigured, or signaled to the UE using at least one of a radio resource control message or downlink control information.

In some aspects, the first layer and the second layer are two layers of a plurality of layers. In some aspects, the report includes: an explicit indication of a reference number of coefficients to be used to characterize the compressed CSI for a reference layer, and for each layer other than the reference layer, an indication of a relationship between a number of coefficients to be used for the layer and either the reference number of coefficients or a number of coefficients for another layer.

In some aspects, the first number and the second number are indicated using an index value that corresponds to an entry in a table. In some aspects, the table stores information that indicates relationships between a plurality of index values and a corresponding plurality of sets of numbers of coefficients for a plurality of layers. In some aspects, each set of numbers includes a number of coefficients for one or more layers of the plurality of layers. In some aspects, a number of bits used to indicate the index value is based at least in part on a ceiling function applied to a binary logarithm of a size of the table.

In some aspects, the first number of coefficients and the second number of coefficients are included in a plurality of numbers of coefficients explicitly identified in the report. In some aspects, a number of bits used to indicate a number of coefficients, of the plurality of numbers of coefficients, for a layer is determined based at least in part on at least one of: a dimension of a coefficient matrix that is based at least in part on discrete Fourier transform (DFT) bases or discrete cosine transform (DCT) bases, a number of beams for which the compressed CSI is to be reported, a number of transfer domain bases associated with the report, an upper bound on the number of coefficients for the layer, or a combination thereof. In some aspects, the number of bits is determined based at least in part on a ceiling function applied to a binary logarithm of a multiplication result between the number of beams for which the compressed CSI is to be reported and the number of transfer domain bases associated with the report. In some aspects, the number of bits is determined based at least in part on a ceiling function applied to a binary logarithm of the upper bound on the number of coefficients for the layer.

In some aspects, the first layer is included in a first set of layers associated with a first code block and the second layer is included in a second set of layers associated with a second code block. In some aspects, the first number of coefficients is used to characterize the compressed CSI for each layer included in the first set of layers. In some aspects, the second number of coefficients is used to characterize the compressed CSI for each layer included in the second set of layers.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
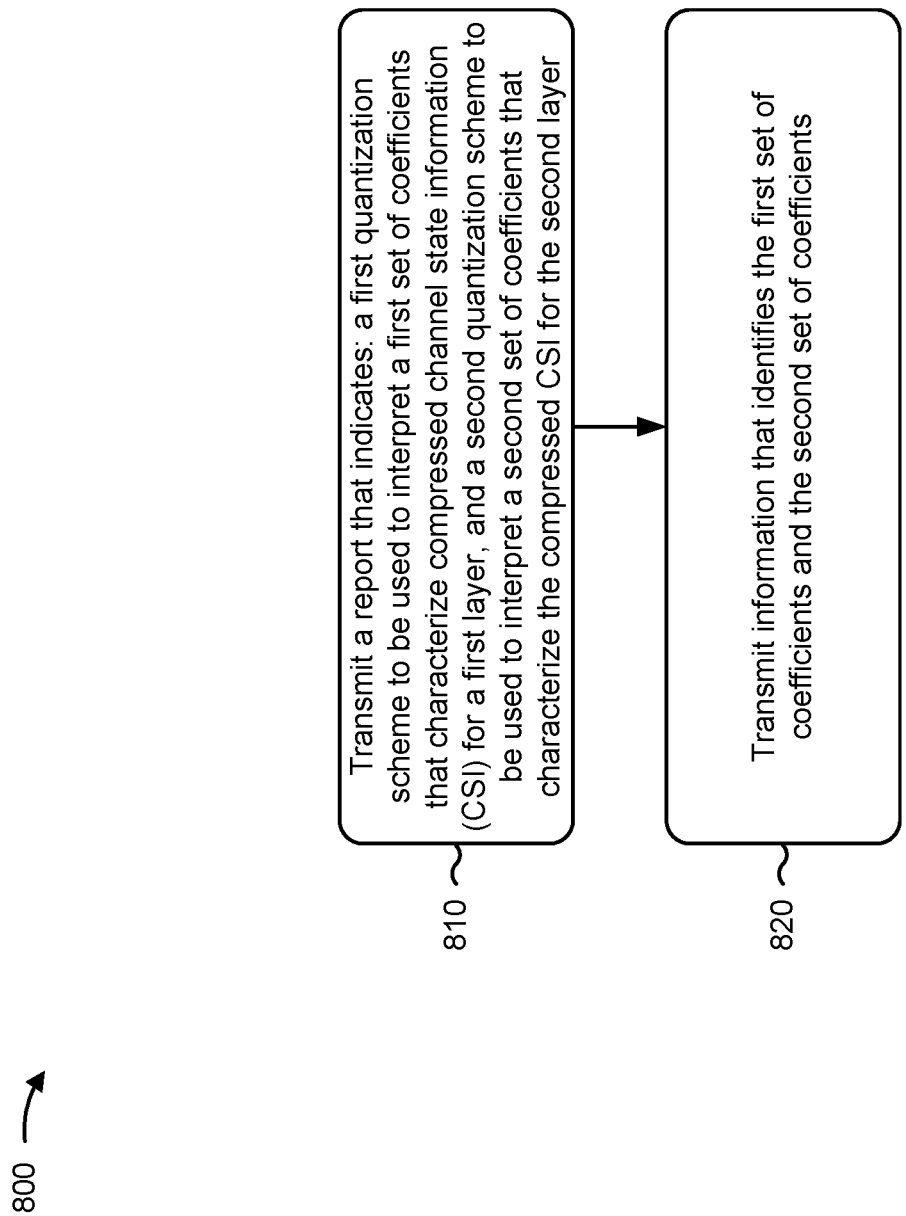

FIG. 8 is a diagram illustrating an example process 800 performed, for example, by a UE, in accordance with various aspects of the present disclosure. Example process 800 is an example where a UE (e.g., UE 120 and/or the like) performs operations associated with layer-specific coefficient quantity and/or quantization scheme reporting for Type II channel state information compression.

As shown in FIG. 8, in some aspects, process 800 may include transmitting, to a base station, a report that indicates a first quantization scheme to be used to interpret a first set of coefficients that characterize compressed channel state information (CSI) for a first layer and a second quantization scheme to be used to interpret a second set of coefficients that characterize the compressed CSI for the second layer (block 810). For example, the UE (e.g., using controller/processor 280, transmit processor 264, TX MIMO processor 266, MOD 254, antenna 252, and/or the like) may transmit, to a base station, a report that indicates a first quantization scheme to be used to interpret a first set of coefficients that characterize compressed channel state information (CSI) for a first layer and a second quantization scheme to be used to interpret a second set of coefficients that characterize the compressed CSI for the second layer, as described above.

As further shown in FIG. 8, in some aspects, process 800 may include transmitting information that identifies the first set of coefficients and the second set of coefficients (block 820). For example, the UE (e.g., using controller/processor 280, transmit processor 264, TX MIMO processor 266, MOD 254, antenna 252, and/or the like) may transmit information that identifies the first set of coefficients and the second set of coefficients, as described above.

Process 800 may include additional aspects, such as any single aspect and/or any combination of aspects described below and/or in connection with one or more other processes described elsewhere herein.

In some aspects, the first quantization scheme and the second quantization scheme are different. In some aspects, the report indicates, for at least one of the first quantization scheme or the second quantization scheme, at least one of: a difference between adjacent quantized coefficients represented by adjacent bit values, a number of bits used to quantize a set of coefficients, or a combination thereof. In some aspects, process 800 includes reporting whether a same quantization scheme is used for all layers. In some aspects, a single bit is used to indicate whether the same quantization scheme is used for all layers.

In some aspects, at least one of the first quantization scheme or the second quantization scheme is determined based at least in part on a rank indication value associated with the first layer and the second layer. In some aspects, the first quantization scheme uses more bits for quantization when the rank indication value is smaller. In some aspects, the first quantization scheme uses fewer bits for quantization when the rank indication value is larger. In some aspects, the rank indication value is transmitted in the report. In some aspects, the at least one of the first quantization scheme or the second quantization scheme is determined based at least in part on a relationship between the rank indication value and the at least one of the first quantization scheme or the second quantization scheme. In some aspects, the relationship is predetermined, preconfigured, or signaled to the UE using at least one of a radio resource control message or downlink control information.

In some aspects, the first quantization scheme is indicated using a first index value of a plurality of index values. In some aspects, the second quantization scheme is indicated using a second index value of the plurality of index values. In some aspects, different index values, of the plurality of index values, indicate at least one of: different differences between adjacent quantized coefficients represented by adjacent bit values, different numbers of bits used to quantize a set of coefficients, or a combination thereof.

In some aspects, the first quantization scheme corresponds to a first number of coefficients to be used to characterize the compressed CSI for the first layer. In some aspects, the second quantization scheme corresponds to a second number of coefficients to be used to characterize the compressed CSI for a second layer. In some aspects, the first quantization scheme is indicated by indicating the first number of coefficients. In some aspects, the second quantization scheme is indicated by indicating the second number of coefficients.

In some aspects, the first quantization scheme is explicitly identified in the report. In some aspects, the second quantization scheme is indicated using an indication of a relationship between the first quantization scheme and the second quantization scheme. In some aspects, the indication of the relationship includes at least one of: an indication that the first quantization scheme and the second quantization scheme are the same, or an indication of an offset. In some aspects, the offset indicates a difference between index values that represent the first quantization scheme and the second quantization scheme. In some aspects, the offset is determined based at least in part on a multiplication result between a first value and a second value. In some aspects, the first value is included in the report and the second value is predetermined, preconfigured, or signaled to the UE using at least one of a radio resource control message or downlink control information. In some aspects, a number of bits used to indicate the relationship is determined based at least in part on a ceiling function applied to a binary logarithm of an upper bound of the first value. In some aspects, the upper bound of the first value is predetermined, preconfigured, or signaled to the UE using at least one of a radio resource control message or downlink control information.

In some aspects, the first quantization scheme and the second quantization scheme are two quantization schemes of a plurality of quantization scheme. In some aspects, the report includes: an explicit indication of a reference index value that represents a reference quantization scheme for a reference layer, and for each layer other than the reference layer, an indication of a relationship between an index value that represents a quantization scheme to be used for the layer and either the reference index value or an index value for another layer.

In some aspects, the first quantization scheme and the second quantization scheme are indicated using an index value that corresponds to an entry in a table. In some aspects, the table stores information that indicates a relationship between a plurality of index values and a corresponding plurality of quantization schemes for a plurality of layers. In some aspects, a number of bits used to indicate the index value is based at least in part on a ceiling function applied to a binary logarithm of a length or size of the table.

In some aspects, the first quantization scheme and the second quantization scheme are included in a plurality of quantization schemes explicitly identified in the report. In some aspects, the first layer is included in a first set of layers associated with a first code block and the second layer is included in a second set of layers associated with a second code block. In some aspects, the first quantization scheme is used for each layer included in the first set of layers. In some aspects, the second quantization scheme is used for each layer included in the second set of layers.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
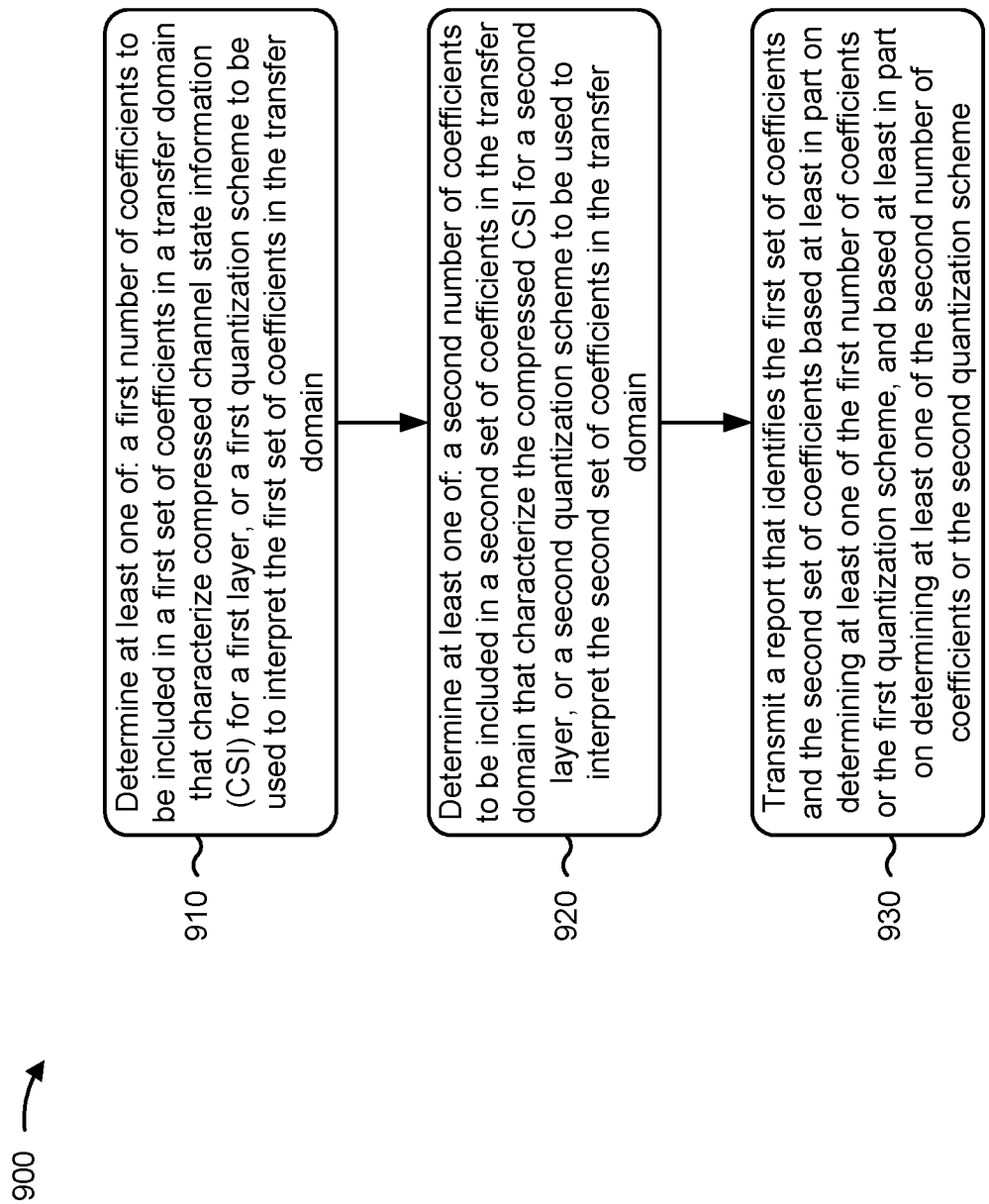

FIG. 9 is a diagram illustrating an example process 900 performed, for example, by a UE, in accordance with various aspects of the present disclosure. Example process 900 is an example where a UE (e.g., UE 120 and/or the like) performs operations associated with layer-specific coefficient quantity and/or quantization scheme reporting for Type II channel state information compression.

As shown in FIG. 9, in some aspects, process 900 may include determining at least one of a first number of coefficients to be included in a first set of coefficients in a transfer domain that characterize compressed channel state information (CSI) for a first layer, or a first quantization scheme to be used to interpret the first set of coefficients in the transfer domain (block 910). For example, the UE (e.g., using controller/processor 280 and/or the like) may determine at least one of a first number of coefficients to be included in a first set of coefficients in a transfer domain that characterize compressed channel state information (CSI) for a first layer, or a first quantization scheme to be used to interpret the first set of coefficients in the transfer domain, as described above.

As further shown in FIG. 9, in some aspects, process 900 may include determining at least one of a second number of coefficients to be included in a second set of coefficients in the transfer domain that characterize the compressed CSI for a second layer, or a second quantization scheme to be used to interpret the second set of coefficients in the transfer domain (block 920). For example, the UE (e.g., using controller/processor 280 and/or the like) may determine at least one of a second number of coefficients to be included in a second set of coefficients in the transfer domain that characterize the compressed CSI for a second layer, or a second quantization scheme to be used to interpret the second set of coefficients in the transfer domain, as described above.

As further shown in FIG. 9, in some aspects, process 900 may include transmitting a report that identifies the first set of coefficients and the second set of coefficients based at least in part on determining at least one of the first number of coefficients or the first quantization scheme, and based at least in part on determining at least one of the second number of coefficients or the second quantization scheme (block 930). For example, the UE (e.g., using controller/processor 280, transmit processor 264, TX MIMO processor 266, MOD 254, antenna 252, and/or the like) may transmit a report that identifies the first set of coefficients and the second set of coefficients based at least in part on determining at least one of the first number of coefficients or the first quantization scheme, and based at least in part on determining at least one of the second number of coefficients or the second quantization scheme, as described above.

Process 900 may include additional aspects, such as any single aspect and/or any combination of aspects described below and/or in connection with one or more other processes described elsewhere herein.

In some aspects, the report includes at least one of: an indication of the first number of coefficients and the second number of coefficients, an indication of the first quantization scheme and the second quantization scheme, a combination thereof. In some aspects, at least one of the first number of coefficients, the second number of coefficients, the first quantization scheme, or the second quantization is indicated to the UE by a base station.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
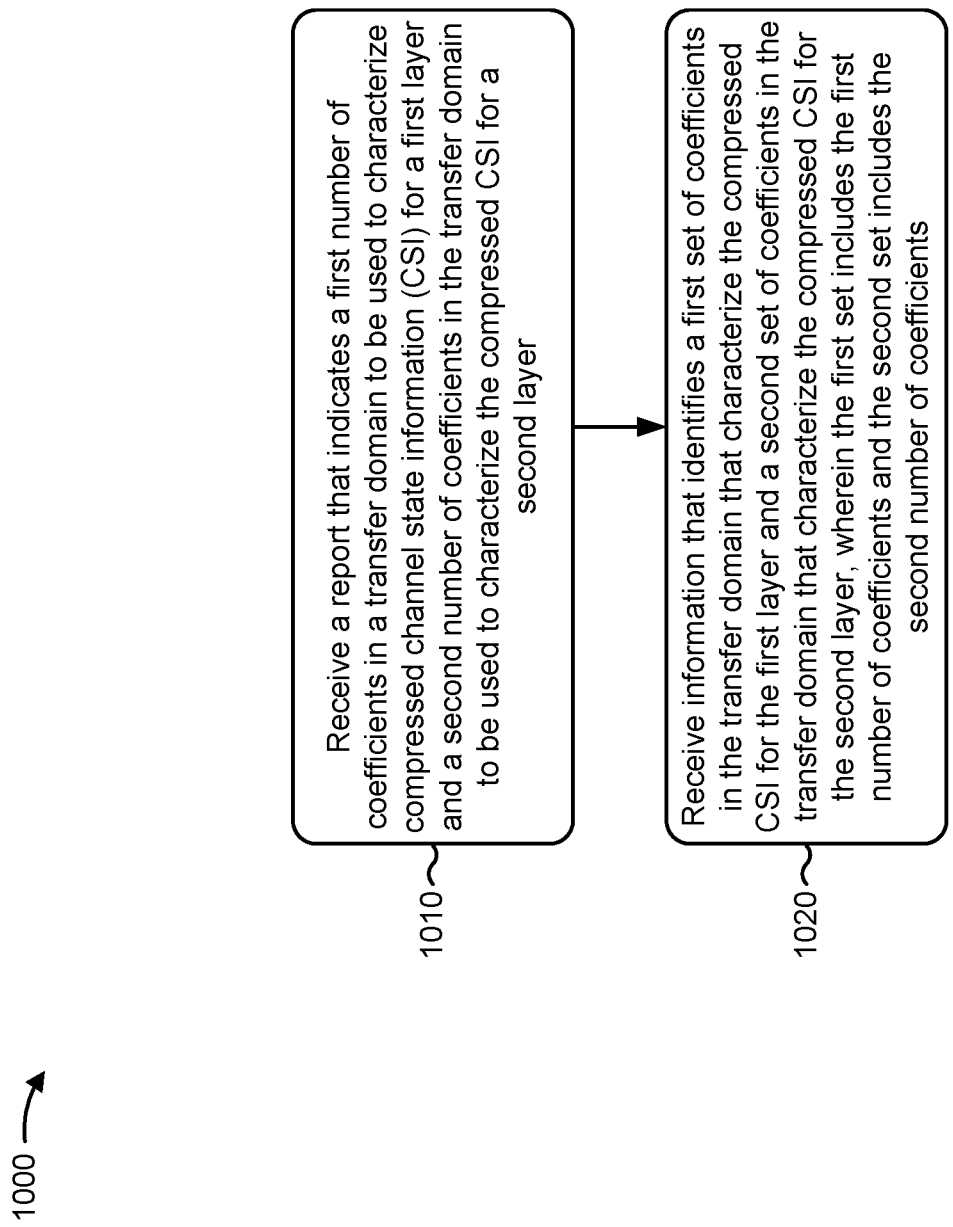

FIG. 10 is a diagram illustrating an example process 1000 performed, for example, by a base station, in accordance with various aspects of the present disclosure. Example process 1000 is an example where a base station (e.g., base station 110 and/or the like) performs operations associated with layer-specific coefficient quantity and/or quantization scheme reporting for Type II channel state information compression.

As shown in FIG. 10, in some aspects, process 1000 may include receiving, from a user equipment (UE), a report that indicates a first number of coefficients in a transfer domain to be used to characterize compressed channel state information (CSI) for a first layer and a second number of coefficients in the transfer domain to be used to characterize the compressed CSI for a second layer (block 1010). For example, the base station (e.g., using antenna 234, DEMOD 232, MIMO detector 236, receive processor 238, controller/processor 240, and/or the like) may receive, from a user equipment (UE), a report that indicates a first number of coefficients in a transfer domain to be used to characterize compressed channel state information (CSI) for a first layer and a second number of coefficients in the transfer domain to be used to characterize the compressed CSI for a second layer, as described above.

As further shown in FIG. 10, in some aspects, process 1000 may include receiving information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients (block 1020). For example, the base station (e.g., using antenna 234, DEMOD 232, MIMO detector 236, receive processor 238, controller/processor 240, and/or the like) may receive information that identifies a first set of coefficients in the transfer domain that characterize the compressed CSI for the first layer and a second set of coefficients in the transfer domain that characterize the compressed CSI for the second layer, as described above. In some aspects, the first set includes the first number of coefficients and the second set includes the second number of coefficients.

Process 1000 may include additional aspects, such as any single aspect and/or any combination of aspects described in connection with one or more other processes described elsewhere herein.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
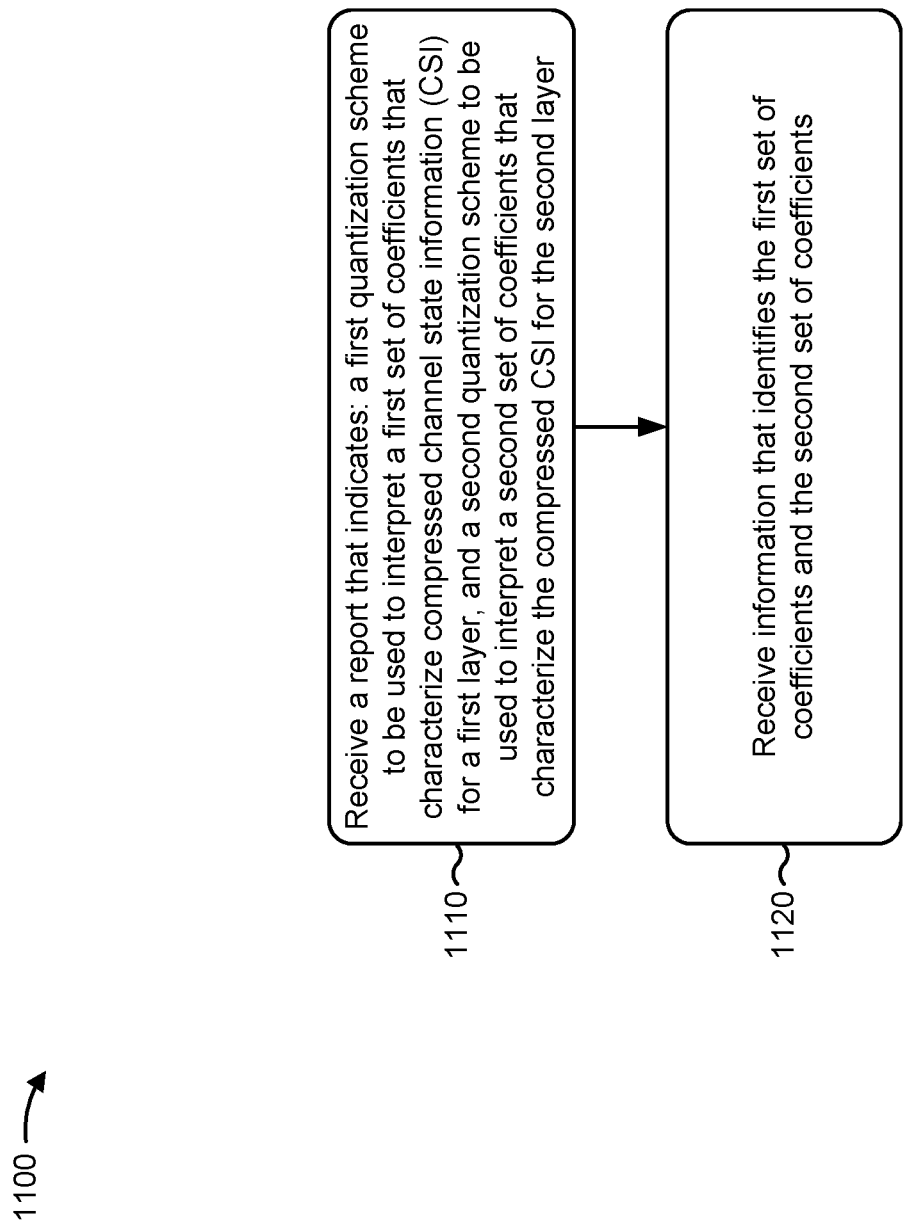

FIG. 11 is a diagram illustrating an example process 1100 performed, for example, by a base station, in accordance with various aspects of the present disclosure. Example process 1100 is an example where a base station (e.g., base station 110 and/or the like) performs operations associated with layer-specific coefficient quantity and/or quantization scheme reporting for Type II channel state information compression.

As shown in FIG. 11, in some aspects, process 1100 may include receiving, from a user equipment (UE), a report that indicates a first quantization scheme to be used to interpret a first set of coefficients that characterize compressed channel state information (CSI) for a first layer and a second quantization scheme to be used to interpret a second set of coefficients that characterize the compressed CSI for the second layer (block 1110). For example, the base station (e.g., using antenna 234, DEMOD 232, MIMO detector 236, receive processor 238, controller/processor 240, and/or the like) may receive, from a user equipment (UE), a report that indicates a first quantization scheme to be used to interpret a first set of coefficients that characterize compressed channel state information (CSI) for a first layer and a second quantization scheme to be used to interpret a second set of coefficients that characterize the compressed CSI for the second layer, as described above.

As further shown in FIG. 11, in some aspects, process 1100 may include receiving information that identifies the first set of coefficients and the second set of coefficients (block 1120). For example, the base station (e.g., using antenna 234, DEMOD 232, MIMO detector 236, receive processor 238, controller/processor 240, and/or the like) may receive information that identifies the first set of coefficients and the second set of coefficients, as described above.

Process 1100 may include additional aspects, such as any single aspect and/or any combination of aspects described in connection with one or more other processes described elsewhere herein.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
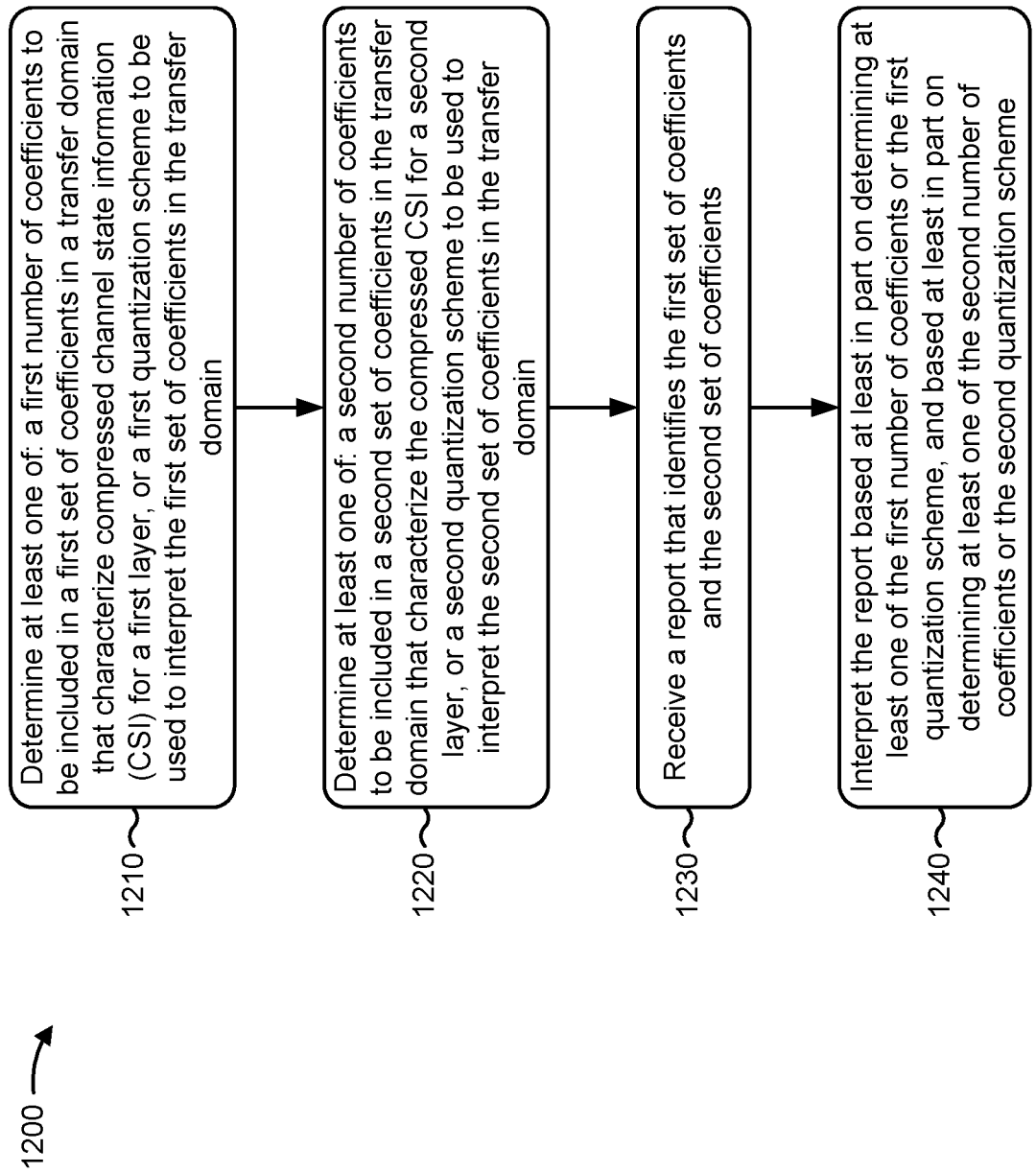

FIG. 12 is a diagram illustrating an example process 1200 performed, for example, by a base station, in accordance with various aspects of the present disclosure. Example process 1200 is an example where a base station (e.g., base station 110 and/or the like) performs operations associated with layer-specific coefficient quantity and/or quantization scheme reporting for Type II channel state information compression.

As shown in FIG. 12, in some aspects, process 1200 may include determining at least one of a first number of coefficients to be included in a first set of coefficients in a transfer domain that characterize compressed channel state information (CSI) for a first layer, or a first quantization scheme to be used to interpret the first set of coefficients in the transfer domain (block 1210). For example, the base station (e.g., using controller/processor 240 and/or the like) may determine at least one of a first number of coefficients to be included in a first set of coefficients in a transfer domain that characterize compressed channel state information (CSI) for a first layer, or a first quantization scheme to be used to interpret the first set of coefficients in the transfer domain, as described above.

As further shown in FIG. 12, in some aspects, process 1200 may include determining at least one of a second number of coefficients to be included in a second set of coefficients in the transfer domain that characterize the compressed CSI for a second layer, or a second quantization scheme to be used to interpret the second set of coefficients in the transfer domain (block 1220). For example, the base station (e.g., using controller/processor 240 and/or the like) may determine at least one of a second number of coefficients to be included in a second set of coefficients in the transfer domain that characterize the compressed CSI for a second layer, or a second quantization scheme to be used to interpret the second set of coefficients in the transfer domain, as described above.

As further shown in FIG. 12, in some aspects, process 1200 may include receiving, from a user equipment (UE), a report that identifies the first set of coefficients and the second set of coefficients (block 1230). For example, the base station (e.g., using antenna 234, DEMOD 232, MIMO detector 236, receive processor 238, controller/processor 240, and/or the like) may receive, from a user equipment (UE), a report that identifies the first set of coefficients and the second set of coefficients, as described above.

As further shown in FIG. 12, in some aspects, process 1200 may include interpreting the report based at least in part on determining at least one of the first number of coefficients or the first quantization scheme, and based at least in part on determining at least one of the second number of coefficients or the second quantization scheme (block 1240). For example, the base station (e.g., using controller/processor 240 and/or the like) may interpret the report based at least in part on determining at least one of the first number of coefficients or the first quantization scheme, and based at least in part on determining at least one of the second number of coefficients or the second quantization scheme, as described above.

Process 1200 may include additional aspects, such as any single aspect and/or any combination of aspects described below and/or in connection with one or more other processes described elsewhere herein.

In some aspects, the report includes at least one of: an indication of the first number of coefficients and the second number of coefficients, an indication of the first quantization scheme and the second quantization scheme, or a combination thereof. In some aspects, at least one of the first number of coefficients, the second number of coefficients, the first quantization scheme, or the second quantization is indicated to the UE by the base station.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting, to a base station, a report that indicates a first number of coefficients in a transfer domain to be used to characterize compressed channel state information (CSI) for a first layer and a second number of coefficients in the transfer domain to be used to characterize the compressed CSI for a second layer, wherein the first number of coefficients and the second number of coefficients are based at least in part on a rank indication value associated with the first layer and the second layer; and
    transmitting information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients.

2. The method of claim 1, wherein the first number of coefficients is a larger number when the rank indication value is smaller, and wherein the first number of coefficients is a smaller number when the rank indication value is larger.

3. The method of claim 1, wherein the rank indication value is transmitted in the report.

4. The method of claim 1, wherein the at least one of the first number of coefficients or the second number of coefficients is determined based at least in part on a relationship between the rank indication value and the at least one of the first number of coefficients or the second number of coefficients.

5. The method of claim 4, wherein the relationship is predetermined, preconfigured, or signaled to the UE using at least one of a radio resource control message or downlink control information.

6. The method of claim 1, wherein the first number of coefficients and the second number of coefficients are different.

7. The method of claim 1, further comprising reporting whether a same number of coefficients is used for all layers.

8. The method of claim 7, wherein a single bit is used to indicate whether the same number of coefficients is used for all layers.

9. The method of claim 1, wherein the second number of coefficients is greater than the first number of coefficients.

10. The method of claim 1, wherein the report indicates a first number of bits used to represent the first number of coefficients.

11. The method of claim 10, wherein the first number of bits is determined based at least in part on at least one of:
    a dimension of a coefficient matrix that is based at least in part on discrete Fourier transform (DFT) bases or discrete cosine transform (DCT) bases,
    a number of beams for which the compressed CSI is to be reported,
    a number of transfer domain bases associated with the report,
    an upper bound on the first number of coefficients, or
    a combination thereof.

12. The method of claim 11, wherein the first number of bits is determined based at least in part on a ceiling function applied to a binary logarithm of a multiplication result between the number of beams for which the compressed CSI is to be reported and the number of transfer domain bases associated with the report, or wherein the first number of bits is determined based at least in part on a ceiling function applied to a binary logarithm of the upper bound on the first number of coefficients.

13. The method of claim 11, wherein the upper bound is predetermined, preconfigured, or signaled to the UE.

14. The method of claim 1, wherein the first number is explicitly identified in the report.

15. The method of claim 1, wherein the second number is indicated using an indication of a relationship between the first number and the second number.

16. The method of claim 15, wherein the indication of the relationship includes at least one of:
    an indication that the first number and the second number are the same, or
    an indication of an offset, wherein the offset indicates a difference between the first number and the second number.

17. The method of claim 16, wherein the offset is determined based at least in part on a multiplication result between a first value and a second value, wherein the first value is included in the report and the second value is predetermined, preconfigured, or signaled to the UE using at least one of a radio resource control message or downlink control information.

18. The method of claim 17, wherein a number of bits used to indicate the relationship is determined based at least in part on a ceiling function applied to a binary logarithm of an upper bound of the first value.

19. The method of claim 18, wherein the upper bound of the first value is predetermined, preconfigured, or signaled to the UE using at least one of a radio resource control message or downlink control information.

20. The method of claim 1, wherein the first layer and the second layer are two layers of a plurality of layers, and wherein the report includes:
   an explicit indication of a reference number of coefficients to be used to characterize the compressed CSI for a reference layer, and
   for each layer other than the reference layer, an indication of a relationship between a number of coefficients to be used for the layer and either the reference number of coefficients or a number of coefficients for another layer.

21. The method of claim 1, wherein the first number and the second number are indicated using an index value that corresponds to an entry in a table.

22. The method of claim 21, wherein the table stores information that indicates relationships between a plurality of index values and a corresponding plurality of sets of numbers of coefficients for a plurality of layers, wherein each set of numbers includes a number of coefficients for one or more layers of the plurality of layers.

23. The method of claim 21, wherein a number of bits used to indicate the index value is based at least in part on a ceiling function applied to a binary logarithm of a size of the table.

24. The method of claim 1, wherein the first number of coefficients and the second number of coefficients are included in a plurality of numbers of coefficients explicitly identified in the report.

25. The method of claim 24, wherein a number of bits used to indicate a number of coefficients, of the plurality of numbers of coefficients, for a layer is determined based at least in part on at least one of:
   a dimension of a coefficient matrix that is based at least in part on discrete Fourier transform (DFT) bases or discrete cosine transform (DCT) bases,
   a number of beams for which the compressed CSI is to be reported,
   a number of transfer domain bases associated with the report,
   an upper bound on the number of coefficients for the layer, or
   a combination thereof.

26. The method of claim 25, wherein the number of bits is determined based at least in part on a ceiling function applied to a binary logarithm of a multiplication result between the number of beams for which the compressed CSI is to be reported and the number of transfer domain bases associated with the report, or wherein the number of bits is determined based at least in part on a ceiling function applied to a binary logarithm of the upper bound on the number of coefficients for the layer.

27. A method of wireless communication performed by a base station, comprising:
   receiving, from a user equipment (UE), a report that indicates a first number of coefficients in a transfer domain to be used to characterize compressed channel state information (CSI) for a first layer and a second number of coefficients in the transfer domain to be used to characterize the compressed CSI for a second layer, wherein the first number of coefficients and the second number of coefficients are based at least in part on a rank indication value associated with the first layer and the second layer; and
   receiving information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients.

28. An apparatus for wireless communication, comprising:
   one or more communication interfaces; and
   one or more processors coupled to the one or more communication interfaces, wherein the apparatus is configured to:
      cause the one or more communication interfaces to transmit, to a base station, a report that indicates a first number of coefficients in a transfer domain to be used to characterize compressed channel state information (CSI) for a first layer and a second number of coefficients in the transfer domain to be used to characterize the compressed CSI for a second layer, wherein the first number of coefficients and the second number of coefficients are based at least in part on a rank indication value associated with the first layer and the second layer; and
      cause the one or more communication interfaces to transmit information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients.

29. An apparatus for wireless communication, comprising:
   one or more communication interfaces; and
   one or more processors coupled to the one or more communication interfaces, wherein the apparatus is configured to:
      receive, via the one or more communication interfaces from a user equipment (UE), a report that indicates a first number of coefficients in a transfer domain to be used to characterize compressed channel state information (CSI) for a first layer and a second number of coefficients in the transfer domain to be used to characterize the compressed CSI for a second layer, wherein the first number of coefficients and the second number of coefficients are based at least in part on a rank indication value associated with the first layer and the second layer; and
      receive, via the one or more communication interfaces, information that identifies a first set of coefficients in the transfer domain that characterize the compressed CSI for the first layer and a second set of coefficients in the transfer domain that characterize the compressed CSI for the second layer, wherein the first set includes the first number of coefficients and the second set includes the second number of coefficients.

30. The apparatus of claim 28, wherein the first number of coefficients is a larger number when the rank indication value is smaller, and wherein the first number of coefficients is a smaller number when the rank indication value is larger.

\* \* \* \* \*